(12) United States Patent
Kobayashi

(10) Patent No.: US 8,635,174 B2
(45) Date of Patent: Jan. 21, 2014

(54) INFORMATION PROCESSING APPARATUS, OBSERVATION VALUE PREDICTION METHOD, AND PROGRAM

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 12/954,171

(22) Filed: Nov. 24, 2010

(65) Prior Publication Data
US 2011/0137838 A1 Jun. 9, 2011

(30) Foreign Application Priority Data

Dec. 4, 2009 (JP) ................ P2009-277084

(51) Int. Cl.
*G06F 15/18* (2006.01)
*G06F 3/12* (2006.01)

(52) U.S. Cl.
USPC ............................................. 706/13

(58) Field of Classification Search
None
See application file for complete search history.

(56) References Cited

U.S. PATENT DOCUMENTS

| | | | |
|---|---|---|---|
| 7,526,461 B2 * | 4/2009 | Srinivasa et al. ............. | 706/20 |
| 2008/0154808 A1 * | 6/2008 | Grieco ............................ | 706/13 |
| 2008/0256009 A1 * | 10/2008 | Jiang et al. .................... | 706/27 |
| 2011/0028827 A1 * | 2/2011 | Sitaram et al. ................ | 600/410 |
| 2011/0055122 A1 * | 3/2011 | Andreoli ........................ | 706/12 |

FOREIGN PATENT DOCUMENTS

JP 2009-048266 3/2009

OTHER PUBLICATIONS

Goto et al, Applicability of genetic algorithms to motion analysis of a moving object, 2002.*

* cited by examiner

*Primary Examiner* — Jeffrey A Gaffin
*Assistant Examiner* — Mikayla Chubb
(74) *Attorney, Agent, or Firm* — Finnegan, Henderson, Farabow, Garrett & Dunner, LLP

(57) ABSTRACT

Provided is an information processing apparatus. The information processing apparatus includes a predictor construction unit. The predictor construction unit creates, by machine learning based on a genetic algorithm and by combining processing functions prepared in advance, feature quantity extraction formulae for extracting, from an observation value observed before a predetermined time, feature quantities of the observation value, and creates a prediction formula for predicting an observation value at the predetermined time based on the feature quantities calculated by the feature quantity extraction formulae. The information processing apparatus further includes a prediction unit. The prediction unit predicts an observation value at a time t from an observation value observed before the time t, by using the prediction formula created by the predictor construction unit.

7 Claims, 28 Drawing Sheets

Step 1 : INPUT OF OBSERVATION VALUE (OVERALL FLOW OF Step 3)

INFORMATION PROCESSING APPARATUS, OBSERVATION VALUE PREDICTION METHOD, AND PROGRAM

BACKGROUND OF THE INVENTION

1. Field of the Invention

The present invention relates to an information processing apparatus, an observation value prediction method, and a program.

2. Description of the Related Art

In recent years, a method is gaining attention that is for automatically extracting, from an arbitrary data group for which it is difficult to quantitatively determine a feature, a feature quantity of the data group. For example, a method of taking arbitrary music data as an input and automatically constructing an algorithm for automatically extracting the music genre to which the music data belongs is known. The music genres, such as jazz, classics and pops, are not quantitatively determined according to the type of instrument or performance mode. Accordingly, in the past, it was generally considered difficult to automatically extract the music genre from music data when arbitrary music data was given.

However, in reality, features that separate the music genres are potentially included in various combinations of information items such as a combination of pitches included in music data, a manner of combining pitches, a combination of types of instruments, a structure of a melody line or a bass line. Accordingly, a study of a feature quantity extractor has been conducted with regard to the possibility of automatic construction, by machine learning, of an algorithm for extracting such feature (hereinafter, feature quantity extractor). As one study result, there can be cited an automatic construction method, described in JP-A-2009-48266, of a feature quantity extractor based on a genetic algorithm. The genetic algorithm is an algorithm that mimics the biological evolutionary process and takes selection, crossover and mutation into consideration in the process of machine learning.

By using the feature quantity extractor automatic construction algorithm described in the patent document mentioned above, a feature quantity extractor for extracting, from arbitrary music data, a music genre to which the music data belongs can be automatically constructed. Also, the feature quantity extractor automatic construction algorithm described in the patent document is highly versatile and is capable of automatically constructing a feature quantity extractor for extracting, not only from the music data but also from arbitrary data group, a feature quantity of the data group. Accordingly, the feature quantity extractor automatic construction algorithm described in the patent document is expected to be applied to feature quantity analysis of artificial data such as music data and image data and feature quantity analysis of various observation quantities existing in nature.

SUMMARY OF THE INVENTION

The feature quantity extractor automatic construction algorithm described in the patent document has been developed to be used for analysis of a feature quantity of arbitrary data. However, although, on the one hand, analysis of existing data is desired, on the other hand, creation, from existing data, of new data having the same feature as the existing data is also desired. The prime example of such desire is future prediction of time-series data. That is, realization of a method of automatically constructing a predictor that creates, from time-series data accumulated in the past, future time-series data having the same feature as the past time-series data is desired.

With respect to this method, the inventor of the present invention has devised a method of automatically constructing, by using the above-described feature quantity extractor automatic construction algorithm, a predictor that predicts future time-series data from past time-series data. The present invention relates to an automatic construction method of such predictor.

In light of the foregoing, it is desirable to provide an information processing apparatus, an observation value prediction method and a program, which are new and improved, and which are capable of automatically creating, by using a feature quantity extractor automatic construction algorithm based on a genetic algorithm, a predictor that predicts future time-series data from past time-series data.

According to an embodiment of the present invention, there is provided an information processing apparatus which includes a predictor construction unit that creates, by machine learning based on a genetic algorithm and by combining processing functions prepared in advance, a plurality of feature quantity extraction formulae for extracting, from an observation value observed before a predetermined time, feature quantities of the observation value, and creates a prediction formula for predicting an observation value at the predetermined time based on the feature quantities calculated by the plurality of feature quantity extraction formulae, and a prediction unit that predicts an observation value at a time t from an observation value observed before the time t, by using the prediction formula created by the predictor construction unit.

After predicting the observation value at the time t from the observation value observed before the time t, the prediction unit may predict, from the observation value at the time t that has been predicted and the observation value observed before the time t, an observation value to be observed at a time t' subsequent to the time t, by using the plurality of feature quantity extraction formulae and the prediction formula created by the predictor construction unit.

The information processing apparatus may further include a prediction data creation unit that prepares an initial value, at a time t0, of an observation value relating to motion of an object, performs, taking the initial value as a first input, prediction processing of the observation value by the prediction unit successively for times tj (j=1, ..., N) following the time t0, and creates prediction data for the observation value at the times t1 to tN, and a motion simulator that simulates the motion of a physical substance by using the prediction data created by the prediction data creation unit.

In a case a new observation value is observed after creating the plurality of feature quantity extraction formulae and the prediction formula, the predictor construction unit may re-create, based on the plurality of feature quantity extraction formulae and the prediction formula that have been already created and from the newly observed observation value, the plurality of feature quantity extraction formulae and the prediction formula.

According to another embodiment of the present invention, there is provided an observation value prediction method which includes the steps of creating, by machine learning based on a genetic algorithm and by combining processing functions prepared in advance, a plurality of feature quantity extraction formulae for extracting, from an observation value observed before a predetermined time, feature quantities of the observation value, and creating a prediction formula for predicting an observation value at the predetermined time based on the feature quantities calculated by the plurality of feature quantity extraction formulae, and predicting an observation value at a time t from an observation value observed before the time t, by using the prediction formula created in the step of creating.

According to another embodiment of the present invention, there is provided a program for causing a computer to realize a predictor construction function of creating, by machine learning based on a genetic algorithm and by combining processing functions prepared in advance, a plurality of feature quantity extraction formulae for extracting, from an observation value observed before a predetermined time, feature quantities of the observation value, and creating a prediction formula for predicting an observation value at the predetermined time based on the feature quantities calculated by the plurality of feature quantity extraction formulae, and a prediction function of predicting an observation value at a time t from an observation value observed before the time t, by using the prediction formula created by the predictor construction function.

According to the embodiments of the present invention described above, it becomes possible to automatically create, by using a feature quantity extractor automatic construction algorithm based on a genetic algorithm, a predictor that predicts future time-series data from past time-series data.

DETAILED DESCRIPTION OF THE EMBODIMENT(S)

Figure 1:
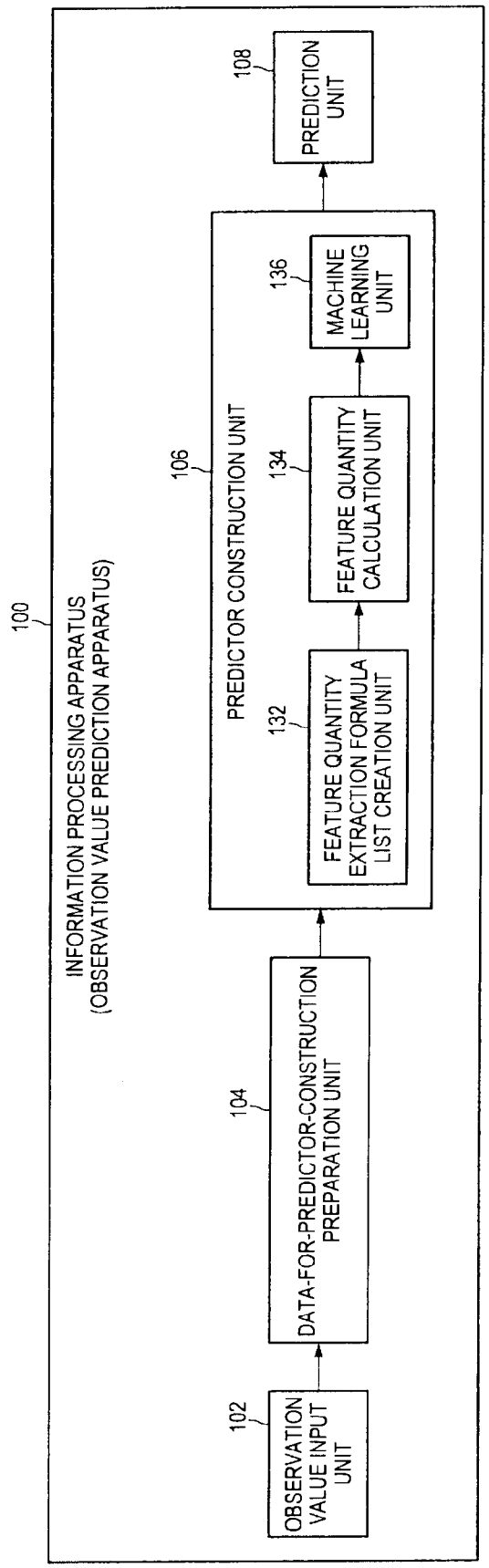
FIG. 1 is an explanatory diagram showing a functional configuration of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of a description of an embodiment of the present invention described later will be briefly mentioned here. First, a functional configuration of an information processing apparatus 100 according to the embodiment will be described with reference to FIG. 1. Next, an input method of an observation value according to the embodiment will be described with reference to FIG. 2. Then, a preparation method of a data set for predictor construction according to the embodiment will be described with reference to FIG. 3. Then, an automatic construction method of a predictor and a prediction method of an observation value by the predictor according to the embodiment will be described with reference to FIG. 4. Then, the prediction method of an observation value according to the embodiment will be described with reference to FIG. 5. Then, an output method of a prediction value according to the embodiment will be described with reference to FIG. 6

Next, an overall flow of processing will be described with reference to FIG. 7 with respect to the prediction method of an observation value according to the embodiment. Then, of the prediction method of an observation value according to the embodiment, a flow of processing relating to a preparation method of a data set for predictor construction will be described with reference to FIG. 8. Then, of the prediction method of an observation value according to the embodiment, a flow of processing relating to a predictor construction method will be described with reference to FIGS. 9 to 22. Then, of the prediction method of an observation value according to the embodiment, a flow of processing relating to a prediction method of an observation that uses a predictor will be described with reference to FIG. 23.

Next, a method of performing motion prediction of a simple pendulum by using the prediction method of an observation value according to the embodiment and a result obtained by actually performing an experiment will be described with reference to FIGS. 24 and 25. Then, a method of performing pattern change prediction of a two-dimensional cellular automaton by using the prediction method of an observation value according to the embodiment and a result obtained by actually performing an experiment will be described with reference to FIGS. 26 and 27. Then, a method of predicting motion of a bird based on a flock-of-bird algorithm by using the prediction method of an observation value according to the embodiment and a result obtained by actually performing an experiment will be described with reference to FIGS. 28 and 29.

Next, an example of a hardware configuration capable of realizing a function of the information processing apparatus 100 according to the embodiment will be described with reference to FIG. 30. Lastly, a technical idea of the embodiment will be summarized, and an operational effect obtained by the technical idea will be briefly described.

(Description Items)

1: Embodiment
  1-1: Functional Configuration of Information Processing Apparatus 100
  1-2: Overview of Observation Value Prediction Method
  1-3: Details of Algorithm
    1-3-1: Overall Flow
    1-3-2: Preparation of Data Set for Predictor Construction
    1-3-3: Automatic Construction of Predictor
    1-3-4: Prediction of Observation Value by Predictor
  1-4: Experiment 1 (Application to Simple Pendulum)
  1-5: Experiment 2 (Application to Two-Dimensional Cellular Automaton)
  1-6: Experiment 3 (Application to Flock-of-Bird Algorithm)
2: Hardware Configuration Example
3: Summary 1: Embodiment First, an embodiment of the present invention will be described. The present embodiment relates to a method of automatically constructing, by using an automatic construction algorithm for a feature quantity extractor based on a genetic algorithm, a predictor that creates future time-series data from past time-series data (hereinafter, predictor automatic construction method).

In the following, an explanation will be sequentially given on a functional configuration of an information processing apparatus 100 capable of realizing the predictor automatic construction method according to the present embodiment, an overview of the predictor automatic construction method, an algorithm of the predictor automatic construction method, and an application example of the predictor automatic construction method. Also, in the description, an explanation will be given on a prediction method of an observation value by the predictor created by using the predictor automatic construction method according to the present embodiment.

1-1: Functional Configuration of Information Processing Apparatus 100

First, a functional configuration of the information processing apparatus 100 capable of realizing the predictor automatic construction method and the prediction method according to the present embodiment will be described with reference to FIG. 1. FIG. 1 is an explanatory diagram showing an example of the functional configuration of the information processing apparatus 100 according to the present embodiment.

As shown in FIG. 1, the information processing apparatus 100 is configured from an observation value input unit 102, a data-for-predictor-construction preparation unit 104, a predictor construction unit 106, and a prediction unit 108. Also, the predictor construction unit 106 is configured from a feature quantity extraction formula list creation unit 132, a feature quantity calculation unit 134, and a machine learning unit 136. In the following, a function of each structural element will be described along a flow of processing according to the predictor automatic construction method and a flow of processing according to the prediction method.

First, the observation value input unit 102 acquires an observation value which is past time-series data. Additionally, the observation value input unit 102 may be an observation device for time-series data or may be an acquisition device that acquires the observation value from an external observation device. Also, the observation value input unit 102 may be a communication device that acquires the observation value from outside by a wired or a wireless network or may be an input device for a user to input the observation value. When the observation value is acquired, the observation value input unit 102 inputs the acquired observation value to the data-for-predictor-construction preparation unit 104.

Figure 2:
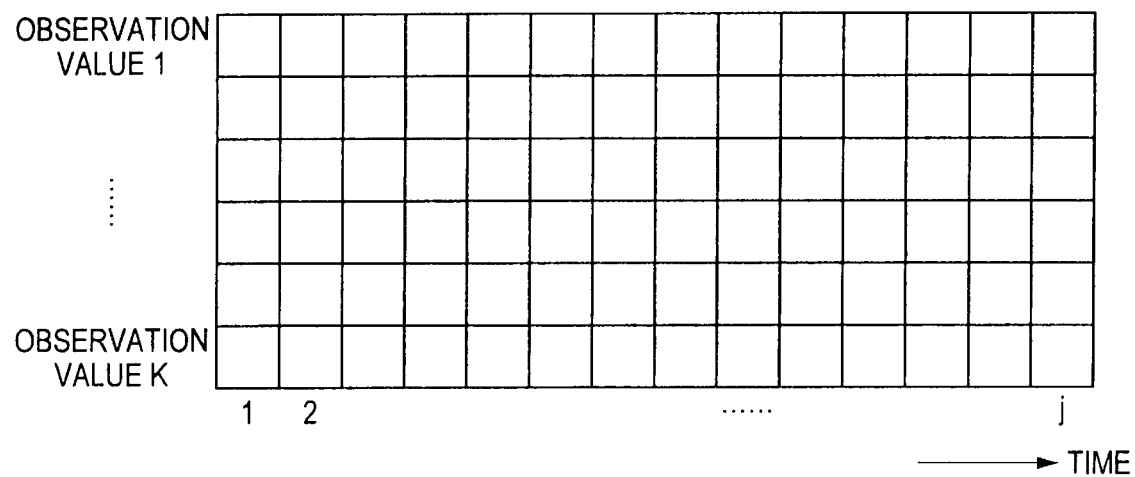
FIG. 2 is an explanatory diagram showing a configuration of an observation value of an observation value input unit according to the embodiment.

The observation value input by the observation value input unit 102 is time-series data having a structure as shown in FIG. 2, for example. As shown in FIG. 2, the time-series data is an observation value group obtained by collecting, until time t ($t=1$ to j; $j \geq 1$), observation values 1 to K ($K \geq 1$) observed at certain times t. Additionally, the type of an observation value may be any type. The expression "observation" is used, but quantization using an observation device or a measurement device does not necessarily have to be performed. For example, the observation value may be data that is artificially created as a sample. In the following, an explanation will be given using an observation value obtained by observing a certain physical quantity by an observation device.

Figure 3:
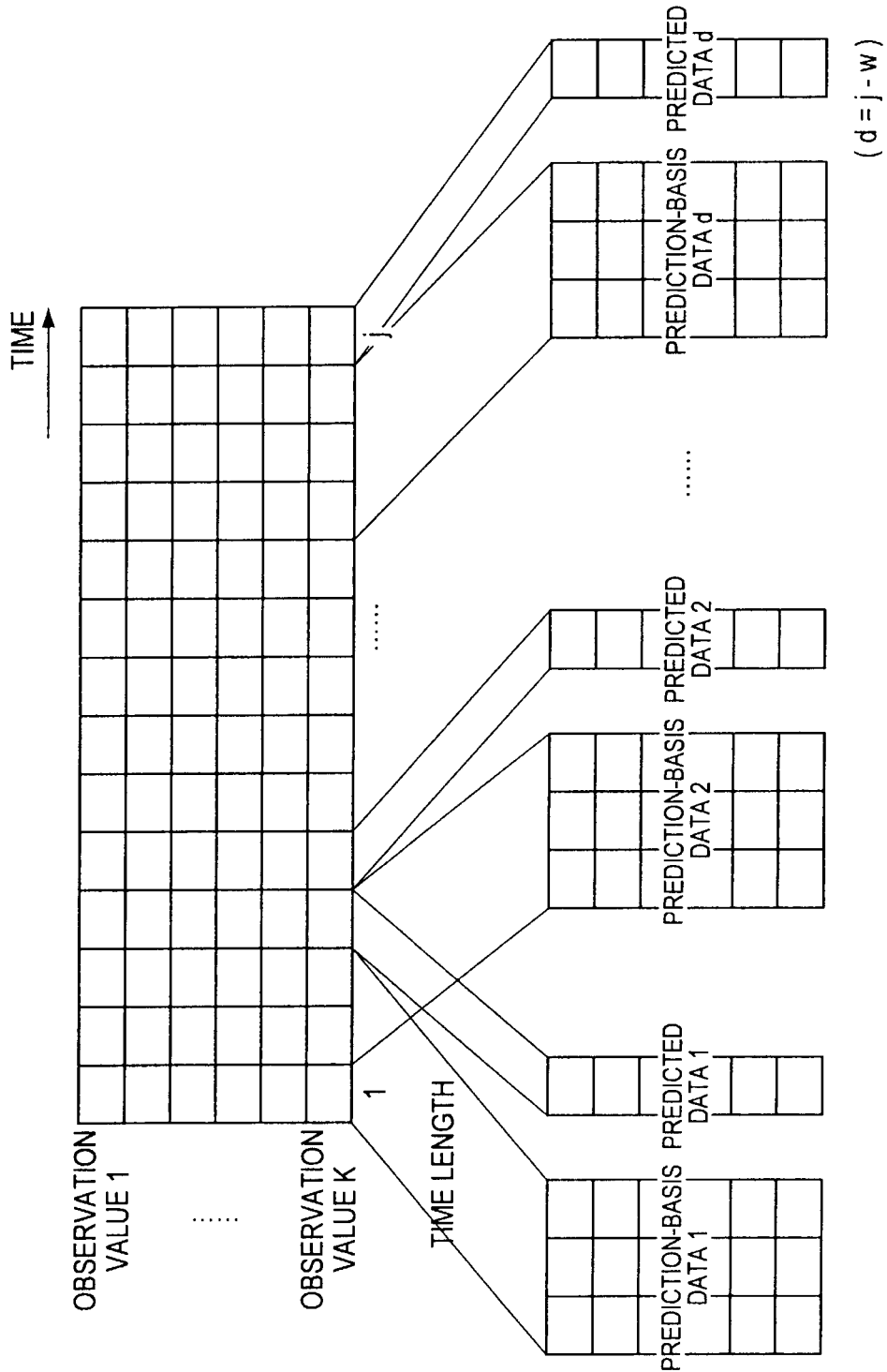
FIG. 3 is an explanatory diagram showing a creation method of a data set for predictor construction by a data-for-predictor-construction preparation unit according to the embodiment.

When such observation value (time-series data) is input, the data-for-predictor-construction preparation unit 104 creates, from the observation value, a data set for learning (hereinafter, data set for predictor construction). This data set for predictor construction is formed from a combination of prediction-basis data used for prediction and predicted data created from the prediction-basis data. For example, as shown in FIG. 3, the data-for-predictor-construction preparation unit 104 extracts, form the observation value, prediction-basis data t (t=1 to d; d=j−w) from time t to t+w−1 having a predetermined time length w. Furthermore, the data-for-predictor-construction preparation unit 104 extracts the observation value corresponding to a next time t+w of each piece of prediction-basis data t, and creates predicted data t to be predicted from each piece of prediction-basis data t.

Figure 4:
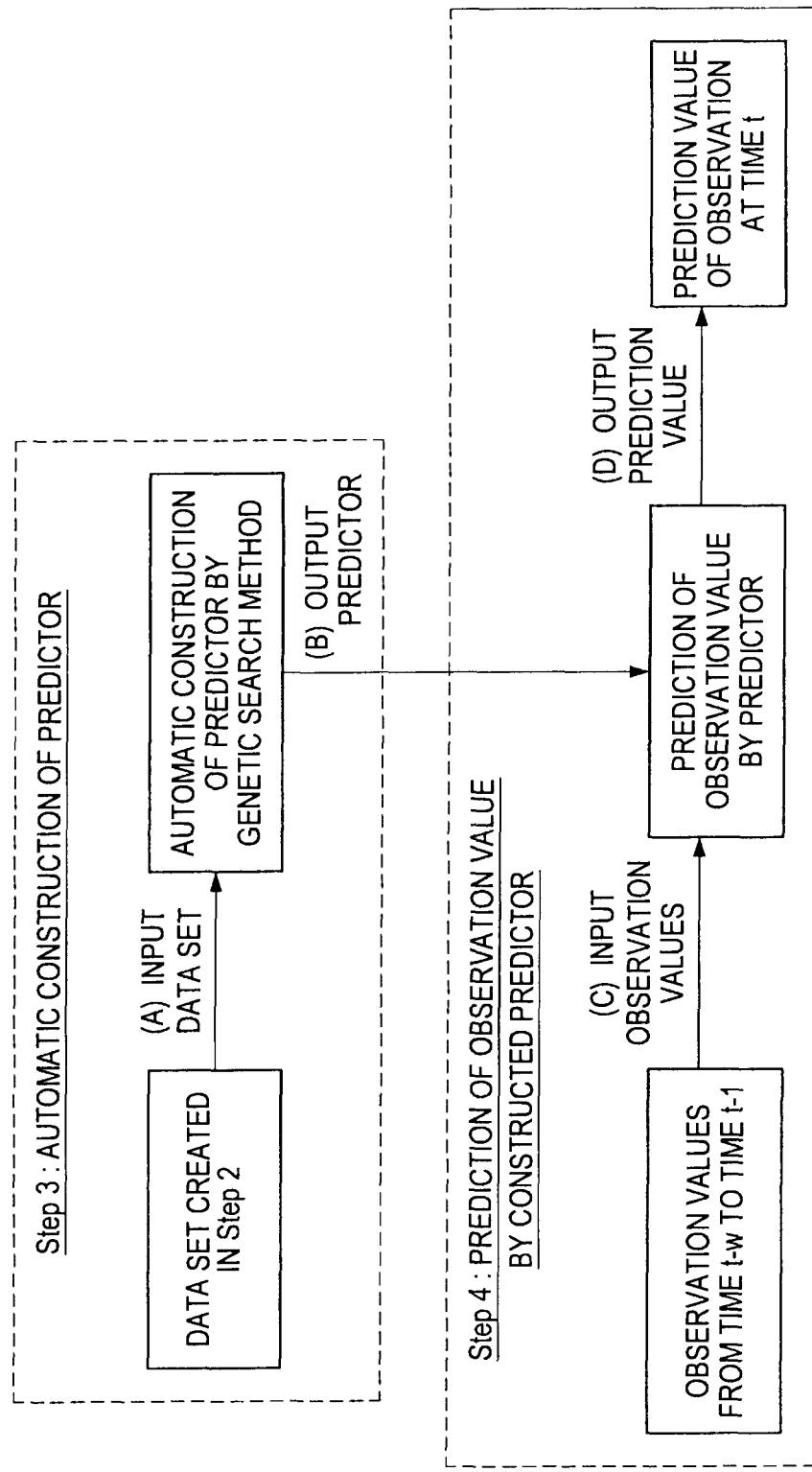
FIG. 4 is an explanatory diagram showing a predictor construction method by a predictor construction unit and a prediction method of an observation value by a prediction unit according to the embodiment.

The data set for predictor construction created by the data-for-predictor-construction preparation unit 104 in this manner is input to the predictor construction unit 106. As shown in FIG. 4, when the data set for predictor construction is input (A), the predictor construction unit 106 automatically constructs a predictor by machine learning based on a genetic algorithm by using the input data set for predictor construction (B). Additionally, an automatic construction algorithm of the predictor construction unit 106 for the predictor will be described later in detail.

First, the feature quantity extraction formula list creation unit 132 creates a feature quantity extraction formula that outputs one scalar quantity (hereinafter, feature quantity), by randomly combining and selecting processing functions prepared in advance. Additionally, a combination of feature quantity extraction formulae created by the feature quantity extraction formula list creation unit 132 will be referred to as a feature quantity extraction formula list. The feature quantity extraction formula list created by the feature quantity extraction formula list creation unit 132 is input to the feature quantity calculation unit 134.

The feature quantity calculation unit 134 calculates the feature quantity by inputting the prediction-basis data in the data set for predictor construction to each feature quantity extraction formula included in the feature quantity extraction formula list. Then, the feature quantities calculated by the feature quantity calculation unit 134 are input to the machine learning unit 136. The machine learning unit 136 performs machine learning by using the predicted data in the data set for predictor construction and the feature quantities calculated by the feature quantity calculation unit 134, and creates a prediction formula expressed by a combination of the feature quantity extraction formulae. The prediction formula is expressed by linear combination of the feature quantity extraction formulae, for example. In this case, a combination coefficient is calculated from a feature quantity group corresponding to the same prediction-basis data and the predicted data by using a statistical method such as a linear regression.

Furthermore, the machine learning unit 136 performs evaluation of the prediction formula by using AIC (Akaike Information Criterion), BIC (Bayesian Information Criterion) or the like, and performs each process of selection, crossover and mutation on the feature quantity extraction formulae forming the prediction formula such that the evaluation will be high. A new combination (next generation) of feature quantity extraction formulae to be the elements forming the prediction formula is created by these processes. Then, the machine learning unit 136 evaluates the prediction formula by using the new combination of feature quantity extraction formulae, and updates (generation change) the combination of feature quantity extraction formulae by each process of selection, crossover and mutation such that the evaluation will be even higher.

After repeating generation change until the evaluation no longer changes, the machine learning unit 136 calculates, for a prediction formula with the highest evaluation, a contribution rate of each feature quantity extraction formula to the prediction formula based on the combination coefficient of each feature quantity extraction formula included in the prediction formula. Furthermore, the machine learning unit 136 adds up the contribution rates of the feature quantity extraction formulae and calculates a total contribution rate to the prediction formula. This total contribution rate is used as an evaluation value of the prediction formula. When the evaluation value is calculated by the function of the machine learning unit 136, the predictor construction unit 106 decides whether or not the evaluation value satisfies a predetermined terminating condition. In a case the prediction value satisfies the terminating condition, the predictor construction unit 106 inputs the prediction formula to the prediction unit 108 as the predictor.

On the other hand, in a case the evaluation value does not satisfy the predetermined terminating condition, the predictor construction unit 106 creates a new prediction formula by the machine learning based on a genetic algorithm by using again the functions of the feature quantity extraction formula list creation unit 132, the feature quantity calculation unit 134 and the machine learning unit 136 and using the contribution rate of each feature quantity extraction formula calculated by the machine learning unit 136. At this time, the predictor construction unit 106 takes the feature quantity extraction formulae included in the prediction formula as a next generation (second generation) feature quantity extraction formulae, and inputs the combination of the feature quantity extraction formulae to the feature quantity extraction formula list creation unit 132.

The feature quantity extraction formula list creation unit 132 selects a feature quantity extraction formula with high contribution rate from the second generation feature quantity extraction formulae, exchanges the forming elements (processing functions) between the feature quantity extraction formulae, randomly changes the forming elements of a feature quantity extraction formula, or creates a new feature quantity extraction formula by randomly combining the processing functions. Then, the feature quantity extraction formula list creation unit 132 creates a second generation feature quantity extraction formula list by feature quantity extraction formulae obtained from the second generation feature quantity extraction formulae and newly created feature quantity extraction formulae. Then, the second generation feature quantity extraction formula list is input to the feature quantity calculation unit 134.

The processing by the feature quantity calculation unit 134 on the second generation feature quantity extraction formula list and the processing by the machine learning unit 136 on the processing result are substantially the same as those for the feature quantity extraction formula list which was first randomly created by the feature quantity extraction formula list creation unit 132. That is, various types of processing are performed on the second generation feature quantity extraction formula list by the functions of the feature quantity calculation unit 134 and the machine learning unit 136 described already, and a prediction formula and a third generation feature quantity extraction formulae are created by the machine learning unit 136. Furthermore, the machine learning unit 136 calculates the contribution rate of each third generation feature quantity extraction formula to the prediction formula and an evaluation value of the prediction formula.

Then, the predictor construction unit 106 decides, based on the evaluation value of the prediction formula calculated by the machine learning unit 136, whether or not the terminating condition is satisfied. In a case the evaluation value satisfies the terminating condition, the predictor construction unit 106 inputs the prediction formula to the prediction unit 108 as the predictor.

On the other hand, in a case the evaluation value does not satisfy the predetermined terminating condition, the predictor construction unit 106 creates a new prediction formula by the machine learning based on a genetic algorithm by using again the functions of the feature quantity extraction formula list creation unit 132, the feature quantity calculation unit 134 and the machine learning unit 136 and using the contribution rate of each feature quantity extraction formula calculated by the machine learning unit 136. At this time, the predictor construction unit 106 takes the feature quantity extraction formulae included in the prediction formula as a next generation (third generation) feature quantity extraction formulae, and inputs the combination of the feature quantity extraction formulae to the feature quantity extraction formula list creation unit 132. Additionally, the processing by the predictor construction unit 106 on the third generation feature quantity extraction formulae is substantially the same as the processing on the second generation feature quantity extraction formulae.

Furthermore, the predictor construction unit 106 repeatedly performs the processes described already while repeating generation change from third generation, fourth generation, . . . , to N-th generation until the evaluation value of one of prediction formulae successively created by the machine learning unit 136 satisfies the terminating condition. Then, the predictor construction unit 106 ends the generation change at the time point the evaluation value of a prediction formula calculated by the machine learning unit 136 satisfied the terminating condition, and outputs the prediction formula as the evaluator. In this manner, the predictor construction unit 106 constructs a highly accurate predictor by using a genetic algorithm. Additionally, the algorithm relating to the operation of the predictor construction unit 106 will be described later in greater detail.

Now, the prediction-basis data which serves as a basis for the predicted data actually desired to be predicted is input to the prediction unit 108. For example, as shown in FIG. 4, the observation values from time t−w to t−1 are input to the prediction unit 108 as the prediction-basis data (C). Thus, the prediction unit 108 inputs the prediction-basis data to the predictor input from the predictor construction unit 106, and predicts an observation data (predicted data) which may be observed at a next time. For example, in a case the prediction-basis data is the observation values from the time t−w to t−1, an observation value which may be observed at time t will be output, with respect to input of this prediction-basis data, from the predictor as the predicted data (D).

Furthermore, the predictor 108 inputs the observation values from time t−w+1 to t−1 and a prediction value corresponding to the observation value at the time t output from the predictor to the predictor as the prediction-basis data, and calculates a prediction value corresponding to time t+1. Then, as shown in FIG. 5, the prediction unit 108 predicts time-series data of an observation data which may be observed until a certain time in the future by repeatedly using the predictor while successively changing the time range of prediction-basis data to be input to the predictor.

Figure 5:
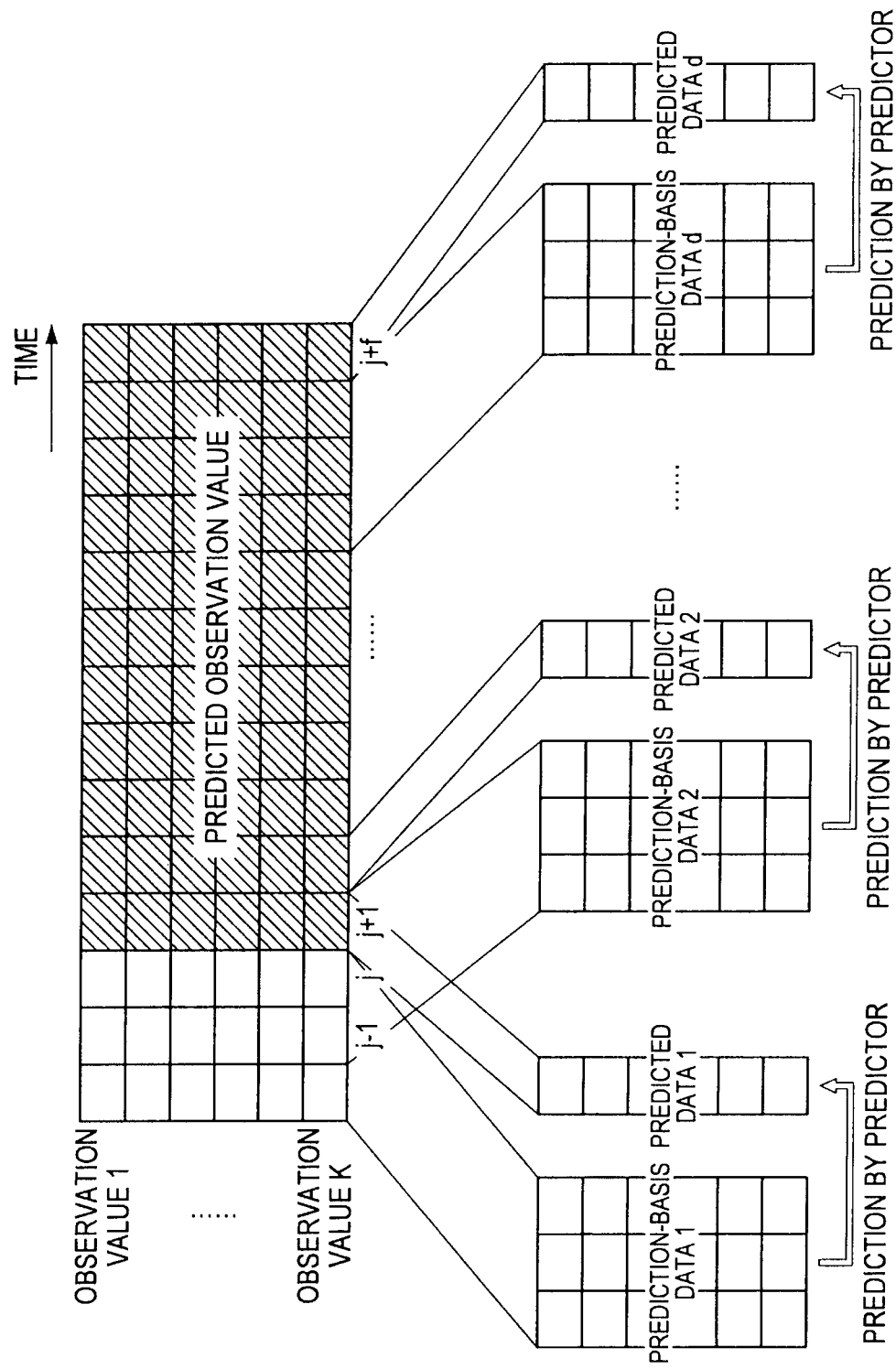
FIG. 5 is an explanatory diagram showing a prediction method of an observation value by the prediction unit according to the embodiment.
Figure 6:
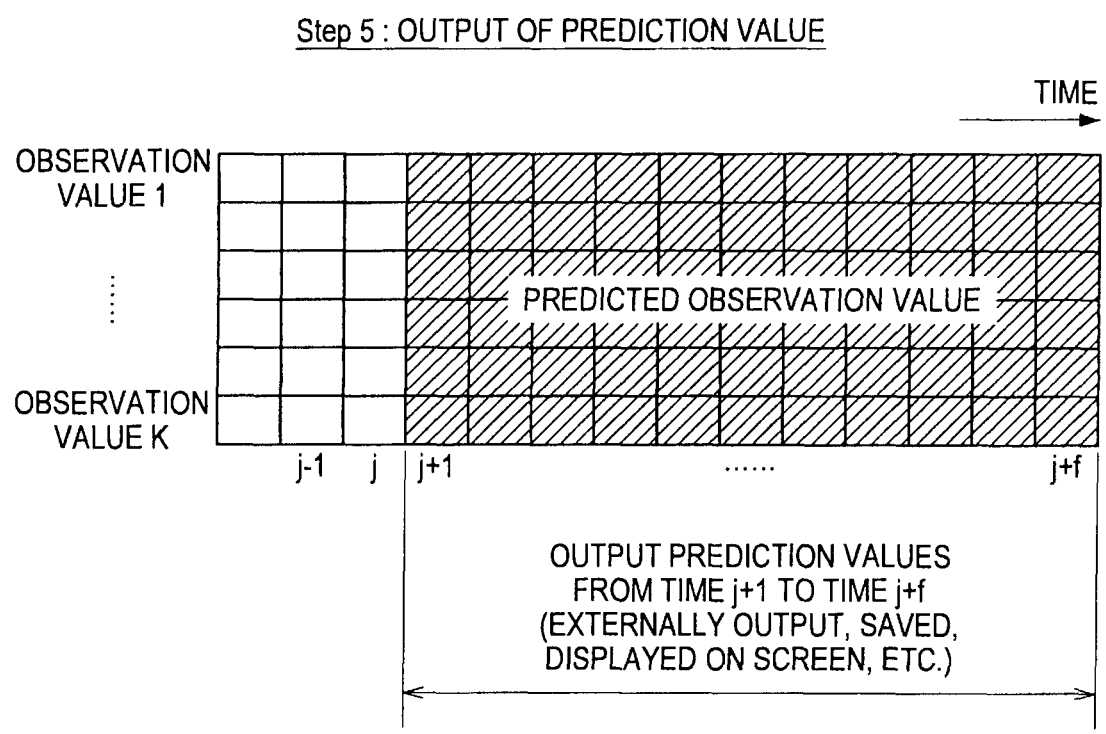
FIG. 6 is an explanatory diagram showing an output method of a prediction value by the prediction unit according to the embodiment.

In the example of FIG. 5, first, observation values 1 to K observed within a predetermined time until time j are used as an initial value of the prediction-basis data (prediction-basis data 1), and observation values 1 to K at time j+1 are calculated as predicted data 1 by the predictor. Next, observation values 1 to K observed within a predetermined time until the time j+1 are used as prediction-basis data 2, and observation values 1 to K observed at time j+2 are calculated as predicted data 2 by the predictor. The same processes are repeatedly performed thereafter, and as a result, pieces of predicted data 1 to f are obtained. In this case, as shown in FIG. 6, the prediction unit 108 outputs the pieces of predicted data 1 to f as the prediction values. Additionally, the pieces of predicted data 1 to f are externally output, saved or displayed on a screen, for example.

Heretofore, the functional configuration of the information processing apparatus 100 according to the present embodiment has been described. Additionally, in the above explanation, the prediction unit 108 is configured to calculate a prediction value by repeatedly using the same predictor. However, the configuration of the information processing apparatus 100 according to the present embodiment is not limited to such, and, in a case a new observation value is input after a prediction value is calculated, the information processing apparatus 100 may update the predictor by the function of the predictor construction unit 106 and calculate prediction values for the new observation value and subsequent observation values by using the updated predictor. Furthermore, update of the predictor may be performed by using a prediction value. Such modifications are also included in the technical scope of the present embodiment.

1-2: Overview of Observation Value Prediction Method

Next, before describing in detail predictor automatic construction and an algorithm relating to prediction to be described later, an overall flow of processing performed in the algorithm will be reviewed so as to help understanding of overall picture of the algorithm.

An observation value prediction method according to the present embodiment is roughly divided into an automatic construction method of a predictor and a prediction method that uses the predictor. The automatic construction method of a predictor is a method of creating a predictor that calculates, from up-to-now observation values, an observation value which may be observed in the future, by machine learning based on a genetic algorithm. For its part, the prediction method that uses a predictor is a method of calculating future observation values in the form of time-series data by repeatedly using the predictor.

The processing according to the automatic construction method of a predictor starts with input of observation values as shown in FIG. 2 (Step 1). As shown in FIG. 3, when observation values are input, a data set for predictor construction is created from the input observation values (Step 2). The data set for predictor construction is formed from prediction-basis data of a predetermined time length extracted from the observation values and predicted data corresponding to a time subsequent to the prediction-basis data. This predetermined time length may be arbitrarily determined by a user or may be automatically selected, as appropriate, according to execution efficiency of an algorithm or execution environment therefor. As shown in (A) and (B) in FIG. 4, when the data set for predictor construction is created, a predictor is automatically constructed by a genetic search method (machine learning based on a genetic algorithm) by using the created data set for predictor construction (Step 3).

Steps 1 to 3 are the main processing contents according to the automatic construction method of a predictor. The predictor created by Step 3 is used in the processing of Steps 4 and 5 according to a prediction method that uses the predictor.

As shown in (C) in FIG. 4, the processing according to the prediction method that uses the predictor starts with input of observation values to be the prediction-basis data to the predictor. As shown in (B) in FIG. 4, when the observation values are input, the predictor outputs a prediction value of an observation value corresponding to a time subsequent to the input observation values. Then, as shown in FIG. 5, by inputting, to the predictor, the output of the predictor and input observation values as the prediction-basis data, the next prediction value is calculated (Step 4). Furthermore, by repeatedly using the predictor, a future time-series data as shown in FIG. 6 is calculated. This future time-series data, which has been calculated, is output as the prediction value (Step 5).

Heretofore, the observation value prediction method according to the present embodiment has been roughly described.

1-3: Details of Algorithm

Next, an algorithm for realizing the observation value prediction method according to the present embodiment will be described in detail.

(1-3-1: Overall Flow)

First, an overall flow of processing according to the observation value prediction method of the present embodiment will be described with reference to FIG. 7. FIG. 7 is an explanatory diagram showing an overall flow of processing according to the observation value prediction method according to the present embodiment. Additionally, the processing described here is performed by the information processing apparatus 100 described above.

Figure 7:
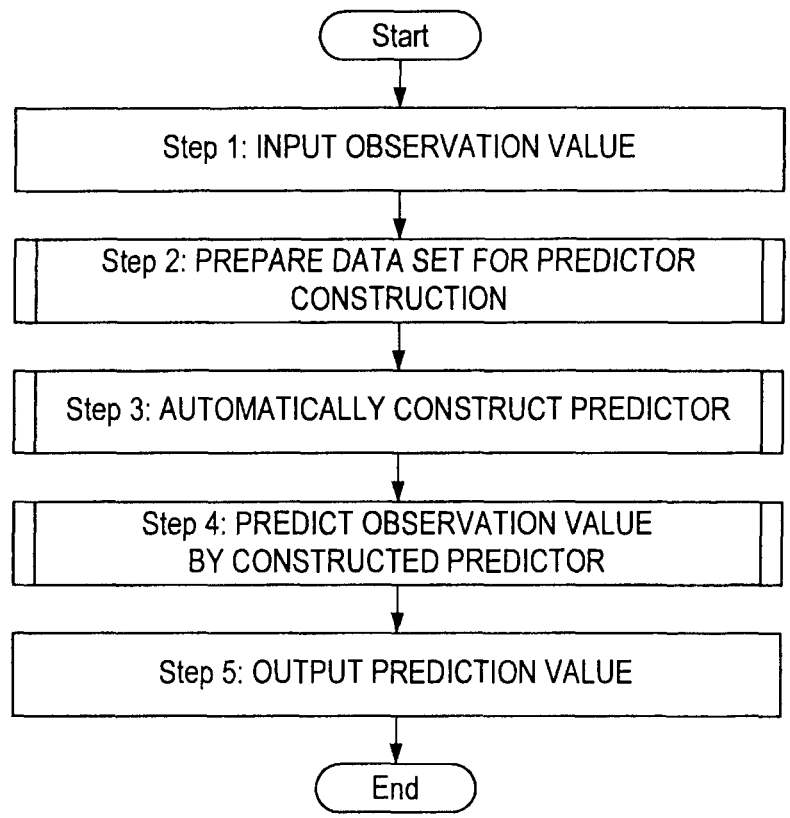
FIG. 7 is an explanatory diagram showing an overall picture of an observation value prediction method according to the embodiment.

As shown in FIG. 7, first, the information processing apparatus 100 uses the function of the observation value input unit 102 and inputs observation values to the data-for-predictor-construction preparation unit 104 (Step 1). Next, the information processing apparatus 100 uses the function of the data-for-predictor-construction preparation unit 104 and prepares a data set for predictor construction by using the input observation values (Step 2).

Next, the information processing apparatus 100 uses the function of the predictor construction unit 106 and automatically constructs a predictor by machine learning based on a genetic algorithm by using the data set for predictor construction (Step 3). Then, the information processing apparatus 100 uses the function of the prediction unit 108 and calculates, by repeatedly using the predictor, a prediction value of an observation value which may be observed in the future (Step 4). Then, the information processing apparatus 100 outputs the prediction value calculated by using the function of the prediction unit 108 (Step 5).

Heretofore, an overall flow of the processing according to the observation value prediction method of the present embodiment has been described.

(1-3-2: Preparation of Data Set for Predictor Construction)

Figure 8:
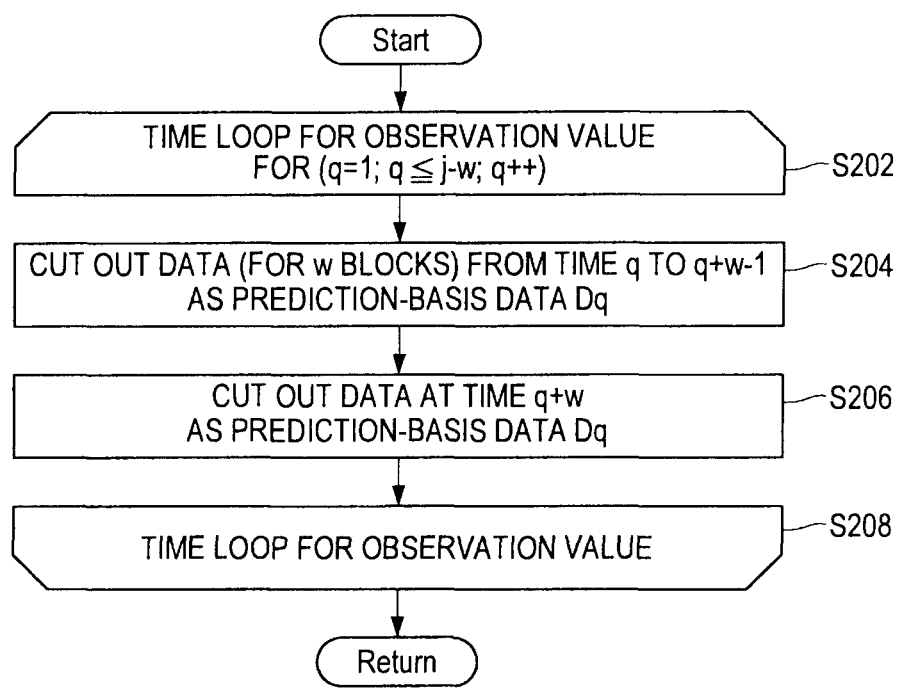
FIG. 8 is an explanatory diagram showing a data-set-for-predictor construction preparation method according to the embodiment.

Next, a flow of preparation processing of a data set for predictor construction corresponding to Step 2 in FIG. 7 will be described with reference to FIG. 8. FIG. 8 is an explanatory diagram showing a flow of preparation processing of a data set for predictor construction corresponding to Step 2 in FIG. 7.

The preparation processing of a data set for predictor construction described here is performed by the function of the data-for-predictor-construction preparation unit 104. Also, it is assumed that observation values 1 to K observed at time t=1 to j−w are input to the data-for-predictor-construction preparation unit 104 in Step 1. Also, it is assumed that the time length of prediction-basis data is set to a predetermined value w.

As shown in FIG. 8, the data-for-predictor-construction preparation unit 104 successively performs the following processes on each of the observation values corresponding to the time t=1 to j−w (S202, S208; time loop for observation value).

First, the data-for-predictor-construction preparation unit 104 sets parameter q to 1 (S202). Then, the data-for-predictor-construction preparation unit 104 cuts out observation values 1 to K from time q to q+w−1 as prediction-basis data Dq (S204). Then, the data-for-predictor-construction preparation unit 104 cuts out observation values 1 to K at time q+w as predicted data Dq (S206).

Next, the data-for-predictor-construction preparation unit 104 repeatedly performs the processes of steps S204 and 206 while incrementing parameter q by 1. When the processes of steps S204 and 206 are performed for parameters q=1 to j−w, the data-for-predictor-construction preparation unit 104 inputs the data set for predictor construction to the predictor construction unit 106. Then, the data-for-predictor-construction preparation unit 104 ends the preparation processing of a data set for predictor construction.

Heretofore, a flow of the preparation processing of a data set for predictor construction has been described.

(1-3-3: Automatic Construction of Predictor)

Next, a flow of automatic construction processing of a predictor corresponding to Step 3 in FIG. 7 will be described with reference to FIGS. 9 to 22. FIGS. 9 to 22 are explanatory diagrams showing flows of the automatic construction processing of a predictor corresponding Step 3 in FIG. 7. The automatic construction processing of a predictor described here is performed by the function of the predictor construction unit 106.

(Overall Flow)

Figure 9:
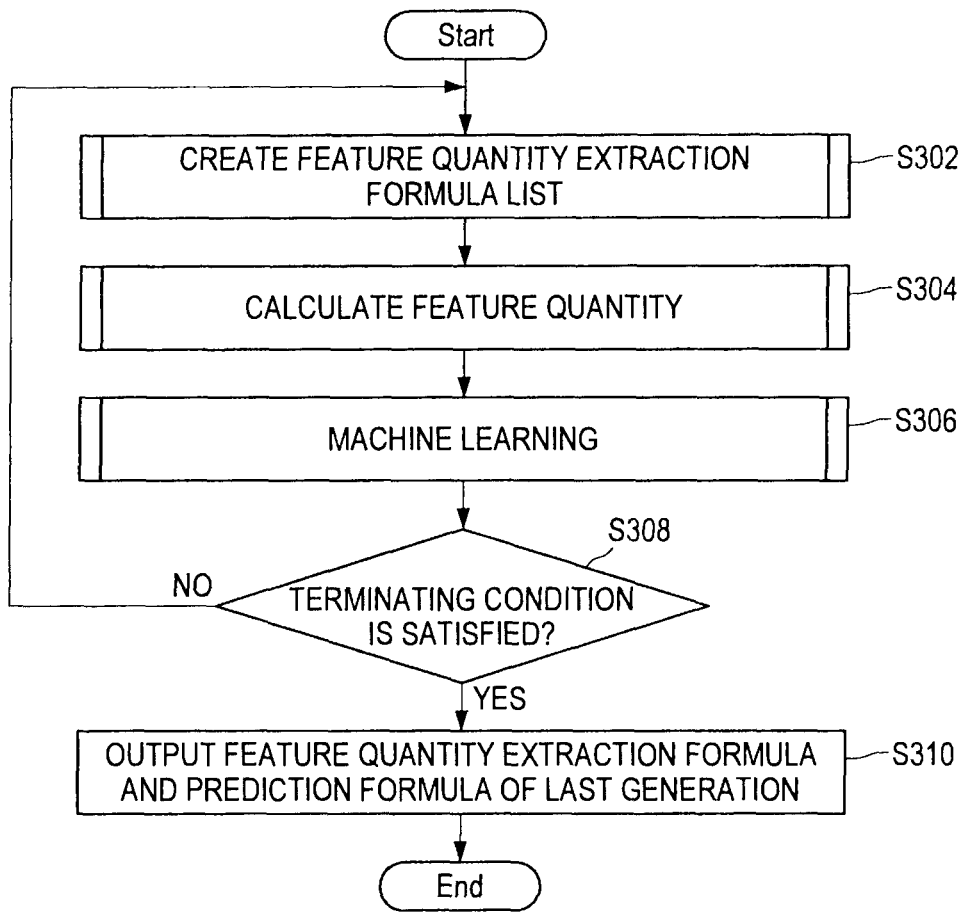
FIG. 9 is an explanatory diagram showing an automatic construction method of a predictor according to the embodiment.

As shown in FIG. 9, first, the predictor construction unit 106 uses the function of the feature quantity extraction formula list creation unit 132 and creates a feature quantity extraction formula list by randomly combining processing functions (S302). Next, the predictor construction unit 106 uses the function of the feature quantity calculation unit 134 and calculates a feature quantity by using each feature quantity extraction formula included in the feature quantity extraction formula list and a data set for predictor construction (S304). Then, the predictor construction unit 106 uses the function of the machine learning unit 136 and creates a prediction formula, which is created by combining the feature quantity extraction formulae, by machine learning based on a genetic algorithm by using the feature quantities and the predicted data in the data set for predictor construction (S306).

Next, the predictor construction unit 106 calculates, by using the function of the machine learning unit 136, contribution rates of the feature quantity extraction formulae (second generation feature quantity extraction formulae) included in the prediction formula to the prediction formula and an evaluation value of the prediction formula based on the contribution rates, and makes a decision regarding a terminating condition based on the evaluation value (S308). In a case the terminating condition is satisfied in step S308, the predictor construction unit 106 outputs the prediction formula as the predictor (S310). On the other hand, in a case the evaluation value did not satisfy the terminating condition, the predictor construction unit 106 creates, by the function of the feature quantity extraction formula list creation unit 132, a second generation feature quantity extraction formula list from the second generation feature quantity extraction formulae based on the genetic algorithm (S302).

Next, the predictor construction unit 106 creates a prediction formula by performing the processes of steps S304 to S310 based on the second generation feature quantity extraction formula list, and calculates its evaluation value (S304 to S310). In a case the evaluation value satisfied the terminating condition, the predictor construction unit 106 outputs the prediction formula as the predictor. On the other hand, in a case the evaluation value did not satisfy the terminating condition, the predictor construction unit 106 performs again the processes of steps S302 to S306 in a similar manner as for the second generation feature quantity extraction formulae. Generation change is repeated in this manner until the evaluation value of a prediction formula satisfies the terminating condition. Then, at a time point the evaluation value of a prediction value satisfied the terminating condition, the prediction formula is output as the predictor.

In the following, the processes of steps S302, S304 and S306 will be described in detail. Additionally, the terminating condition mentioned above is that an end operation is performed by a user or that the predictor of the last generation is sufficiently accurate (that the evaluation value is sufficiently above a predetermined value).

(S302: Creation of Feature Quantity Extraction Formula List)

First, the process of step S302 will be described in greater detail with reference to FIGS. 10 to 18. The process performed here is mainly performed by the function of the feature quantity extraction formula list creation unit 132.

Figure 10:
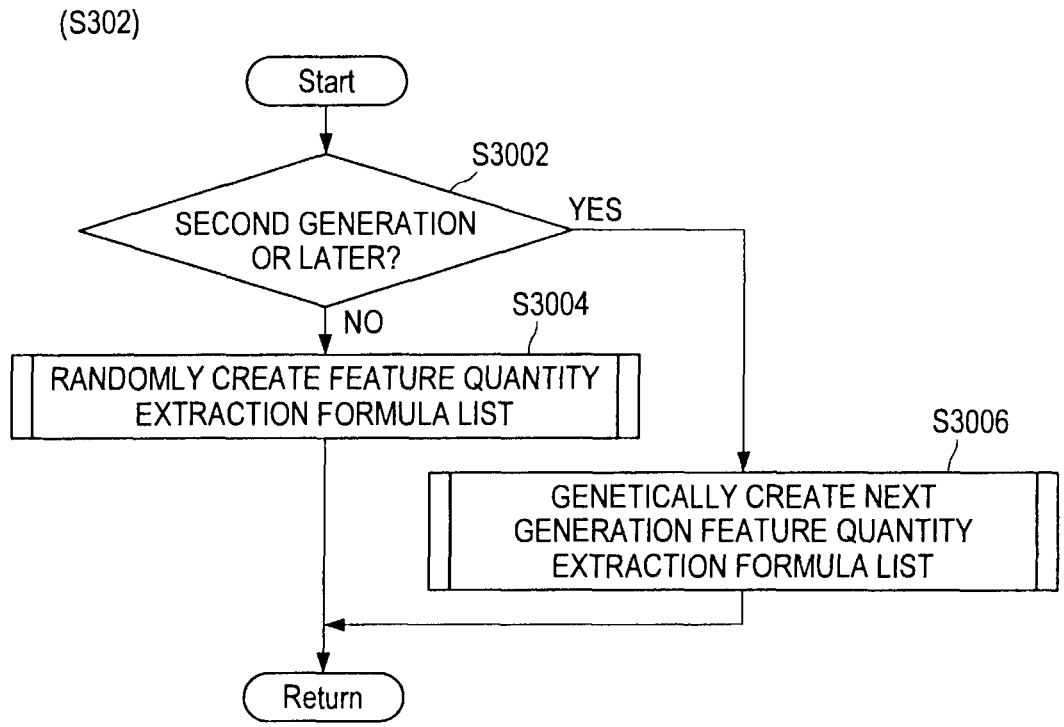
FIG. 10 is an explanatory diagram showing an automatic construction method of the predictor according to the embodiment.

As shown in FIG. 10, the feature quantity extraction formula list creation unit 132 decides whether a feature quantity extraction formula list to be created in step S302 is that of the second generation or later (S3002). In the case of creating a feature quantity extraction formula list of the second generation or later, the feature quantity extraction formula list creation unit 132 proceeds with the process to step S3006. On the other hand, in the case of creating a first generation feature quantity extraction formula list, the feature quantity extraction formula list creation unit 132 proceeds with the process to step S3004.

In the case the process proceeded to step S3004, the feature quantity extraction formula list creation unit 132 creates a feature quantity extraction formula list by randomly combining processing functions (a processing target axis and an operator described later) prepared in advance (S3004). On the other hand, in the case the process proceeded to step S3006, the feature quantity extraction formula list creation unit 132 creates a next generation feature quantity extraction formula list by inputting next generation feature quantity extraction formulae to a genetic algorithm (S3006). The feature quantity extraction formula list created in step S3004 or S3006 is input to the feature quantity calculation unit 134. Then, the predictor construction unit 106 proceeds with the process to step S306.

(S3004 (Cf. S302): Random Creation of Feature Quantity Extraction Formula List)

Here, the process according to step S3004 mentioned above will be described in greater detail with reference to FIG. 11. Additionally, it is assumed that the number of feature quantity extraction formulae included in the feature quantity extraction formula list is set in advance to m.

First, in step S3004, the feature quantity extraction formula list creation unit 132 repeats m times a creation process of a feature quantity extraction formula that is obtained by randomly combining processing functions (S3012, S3016). That is, the feature quantity extraction formula list creation unit 132 repeatedly performs the process of step S3014 while incrementing a parameter M from 1 to m. First, the feature quantity extraction formula list creation unit 132 sets parameter M to 0 (S3012), and creates a feature quantity extraction formula by randomly combining processing functions (S3014).

Next, the feature quantity extraction formula list creation unit 132 increments parameter M by 1 and performs again the process of step S3014 (S3016). After repeatedly performing the process of step S3014 until parameter M reaches m, the feature quantity extraction formula list creation unit 132 inputs the m feature quantity extraction formulae (feature quantity extraction formula list) created by the process at step S3014 to the feature quantity calculation unit 134. Then, the feature quantity extraction formula list creation unit 132 ends the process of step S3004.

(S3014 (Cf. S3004): Random Creation of Feature Quantity Extraction Formula)

Figure 12:
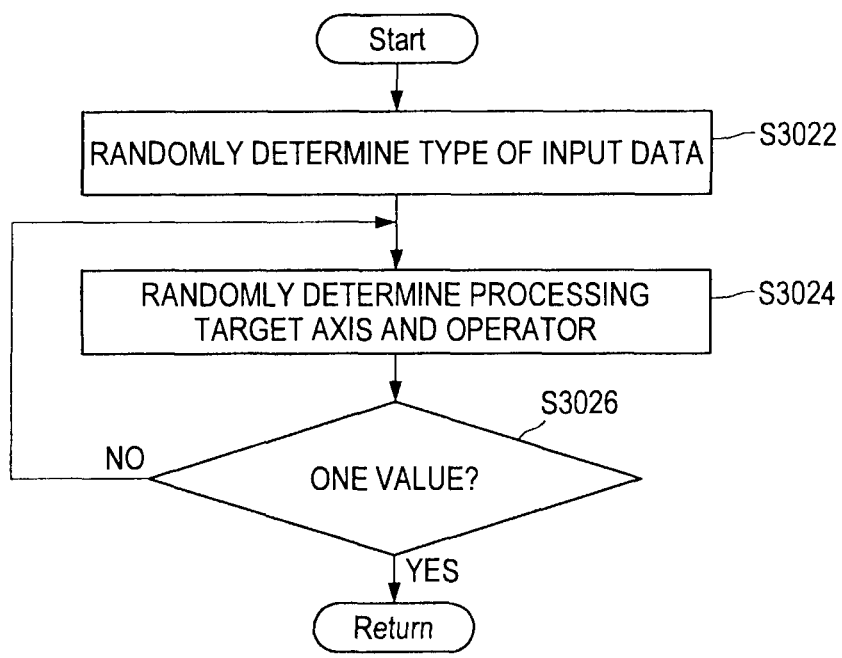
FIG. 12 is an explanatory diagram showing an automatic construction method of the predictor according to the embodiment.

Here, the process according to step S3014 mentioned above will be described in greater detail with reference to FIG. 12. Additionally, it is assumed that the processing functions (processing target axis, operator) used for construction of a feature quantity extraction formula are set in advance. Moreover, the processing target axis here means a coordinate axis to be the target of operation, such as time, frequency, position or the type of observation value. That is, information on along what coordinate axis operation by an operator is to be performed (direction of operation) is specified by the processing target axis.

Furthermore, the operator here is an operator indicating the contents of a process. A feature quantity extraction formula can be constructed by using various types of operators such as differential operation, maximum value output, a low-pass filter, a high-pass filter, an unbiased variance, a fast Fourier transform or absolute value output. Additionally, depending on the type of the operator, a parameter for operation is specified as the operator. For example, in the case of a low-pass filter or a high-pass filter, a parameter for specifying a stopband or a passband is specified. Furthermore, besides the processing functions, information indicating the type of data to be a processing target (hereinafter, type information) may be included in the feature quantity extraction formula.

First, in step S3014, the feature quantity extraction formula list creation unit 132 randomly determines the type (type information) of input data (S3022). However, in a case where the type of input data is one, the process of step S3014 may be skipped. Next, the feature quantity extraction formula list creation unit 132 randomly determines a combination of a processing target axis and an operator (processing functions) for constructing a feature quantity extraction formula (S3024). Then, the feature quantity extraction formula list creation unit 132 creates a feature quantity extraction formula by combining the processing functions that have been randomly determined, and decides whether or not the output of the feature quantity extraction formula will be one value (scalar quantity) (S3026).

Figure 11:
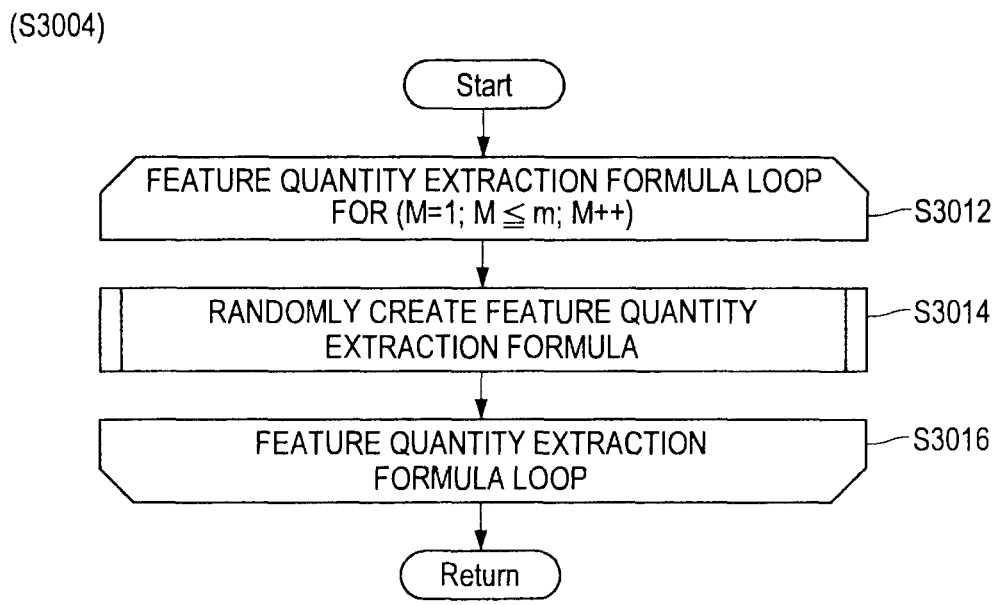
FIG. 11 is an explanatory diagram showing an automatic construction method of the predictor according to the embodiment.

In the case the output of the feature quantity extraction formula becomes one value in step S3028, the feature quantity extraction formula list creation unit 132 proceeds with the process to step S3016 in FIG. 11. On the other hand, in the case the output of the feature quantity extraction formula does not become one value, the feature quantity extraction formula list creation unit 132 returns the process to step S3024, and again creates a feature quantity extraction formula by randomly determining the processing functions.

(S3006 (Cf. S302): Feature Quantity Extraction Formula List Creation by Genetic Algorithm)

Figure 13:
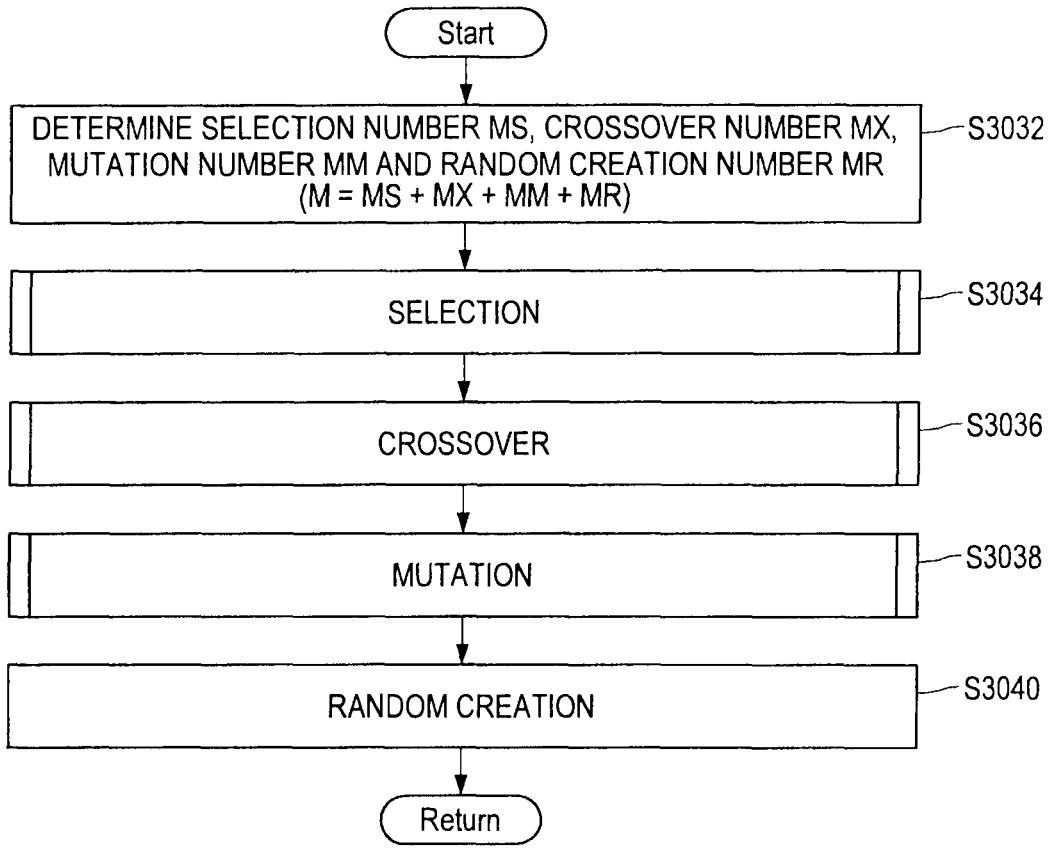
FIG. 13 is an explanatory diagram showing an automatic construction method of the predictor according to the embodiment.

Here, the process according to step S3006 mentioned above will be described in greater detail with reference to FIG. 13.

Additionally, it is assumed that the feature quantity extraction formulae of a g-th (g≥2) generation are input to the feature quantity extraction formula list creation unit 132. Also, it is assumed that the number of feature quantity extraction formulae to be created by a selection operation performed in step S3006 is ms, the number of feature quantity extraction formulae to be created by a crossover operation is mx, the number of feature quantity extraction formulae to be created by mutation is mm, and the number of feature quantity extraction formulae to be randomly created is mr. Furthermore, it is assumed that the number of feature quantity extraction formulae to be included in a feature quantity extraction formula list is m.

First, the feature quantity extraction formula list creation unit 132 determines the selection number ms, the crossover number mx, the mutation number mm and the random creation number mr (S3032). Additionally, the selection number ms, the crossover number mx, the mutation number mm and the random creation number mr may be randomly determined to satisfy m=ms+mx+mm+mr or may be partly or wholly determined in advance, or the selection number ms may be determined based on contribution rates to the g-th generation feature quantity extraction formulae and the crossover number mx, the mutation number mm and the random creation number mr may be randomly determined according to the selection number ms.

When the selection number ms, the crossover number mx and the mutation number mm are determined, the feature quantity extraction formula list creation unit 132 selects ms feature quantity extraction formulae with the highest contribution rates from the g-th generation feature quantity extraction formulae and adds them to the feature quantity extraction formula list (S3034). Next, the feature quantity extraction formula list creation unit 132 exchanges a part of the processing functions between the g-th generation feature quantity extraction formulae, creates mx new feature quantity extraction formulae, and adds them to the feature quantity extraction formula list (S3036).

Next, the feature quantity extraction formula list creation unit 132 selects mm feature quantity extraction formulae from the g-th generation feature quantity extraction formulae, randomly changes a part of the processing functions structuring the feature quantity extraction formulae, and adds the feature quantity extraction formulae after change to the feature quantity extraction formula list (S3038). Next, the feature quantity extraction formula list creation unit 132 randomly creates mr feature quantity extraction formulae, and adds them to the feature quantity extraction formula list (S3040). When the processes of steps S3032 to S3040 are complete, the feature quantity extraction formula list creation unit 132 inputs a feature quantity extraction formula list including the m feature quantity extraction formulae to the feature quantity calculation unit 134. Then, the predictor construction unit 106 proceeds with the process to step S304.

(S3034 (Cf. S3006): Selection)

Here, the process according to step S3034 (selection process) mentioned above will be described in greater detail with reference to FIG. 14. Additionally, the selection process performed here is one of characteristic processes of a genetic algorithm corresponding to the mechanism of, when taking a feature quantity extraction formula as a living body and processing functions as genes, a living body with superior genes surviving with high probability in the evolutionary process.

Figure 14:
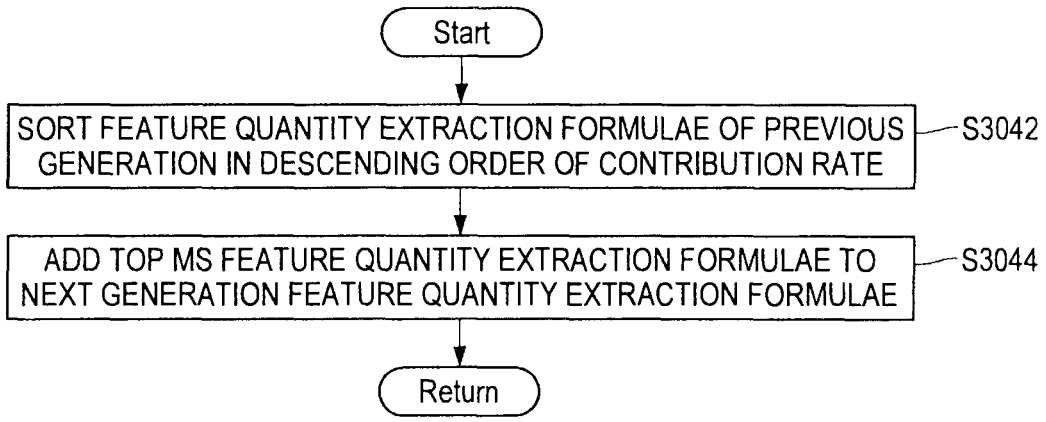
FIG. 14 is an explanatory diagram showing an automatic construction method of the predictor according to the embodiment.

As shown in FIG. 14, first, the feature quantity extraction formula list creation unit 132 arranges the g-th generation feature quantity extraction formulae in the descending order of contribution rate described later (S3042). Next, the feature quantity extraction formula list creation unit 132 adds, to the feature quantity extraction formula list, top ms feature quantity extraction formulae in the descending order of contribution rate (S3044). Then, the feature quantity extraction formula list creation unit 132 proceeds with the process to step S3036.

(S3036 (Cf. S3006): Crossover)

Here, the process according to step S3036 (crossover process) mentioned above will be described in greater detail with reference to FIG. 15. Additionally, the crossover process performed here is one of characteristic processes of a genetic algorithm corresponding to the mechanism of, when taking a feature quantity extraction formula as a living body and processing functions as genes, genes of a living body being partially exchanged in the evolutionary process and a living body with a new combination of genes being born.

Figure 15:
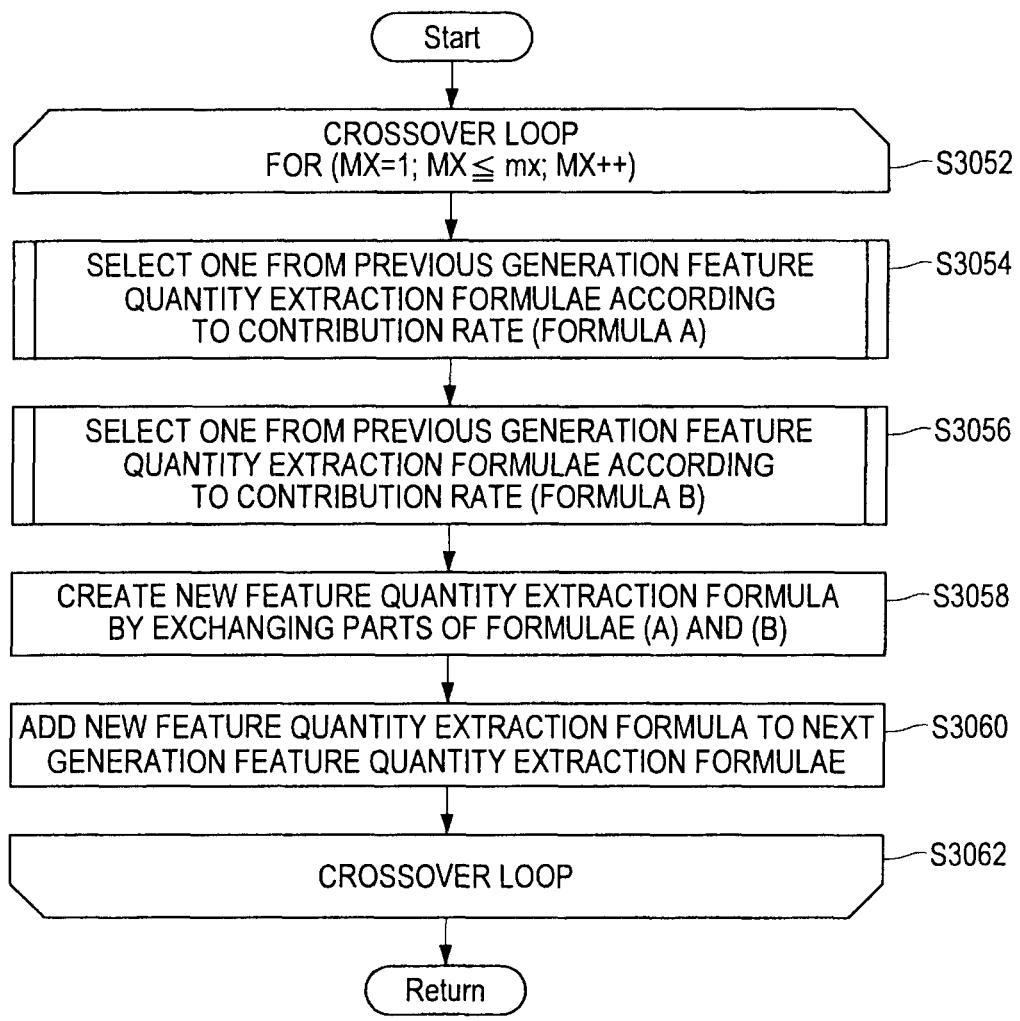
FIG. 15 is an explanatory diagram showing an automatic construction method of the predictor according to the embodiment.

As shown in FIG. 15, the feature quantity extraction formula list creation unit 132 repeatedly performs the processes of step S3054 to S3060 mx times while changing, from 1 to mx, index MX for specifying a feature quantity extraction formula to be created by the crossover process (S3052, S3062). First, the feature quantity extraction formula list creation unit 132 sets index MX to 1, and proceeds with the process to step S3054 (S3052). When the process proceeded to step S3054, the feature quantity extraction formula list creation unit 132 selects one feature quantity extraction formula (formula A) from the g-th generation feature quantity extraction formulae based on the contribution rate (S3054).

Next, the feature quantity extraction formula list creation unit 132 selects one feature quantity extraction formula (formula B) from the g-th generation feature quantity extraction formulae based on the contribution rate (S3056). Then, the feature quantity extraction formula list creation unit 132 creates a new feature quantity extraction formula by exchanging a part of the processing functions included in formula A selected in step S3054 and a part of the processing functions included in formula B selected in step S3056 (S3058). Then, the feature quantity extraction formula list creation unit 132 adds the new feature quantity extraction formula created in step S3058 to the feature quantity extraction formula list (S3060).

After performing the processes of steps S3054 to S3060, the feature quantity extraction formula list creation unit 132 increments index MX by 1, and performs again the processes of steps S3054 to S3060. The feature quantity extraction formula list creation unit 132 repeats the processes of steps S3054 to S3060 until index MX reaches mx, and creates mx feature quantity extraction formulae. Then, the feature quantity extraction formula list creation unit 132 proceeds with the process to step S3038.

(S3054, S3056 (Cf. S3036): Selection of Feature Quantity Extraction Formula)

Here, the processes according to steps S3054 and S3056 mentioned above will be described in greater detail with reference to FIG. 16.

Figure 16:
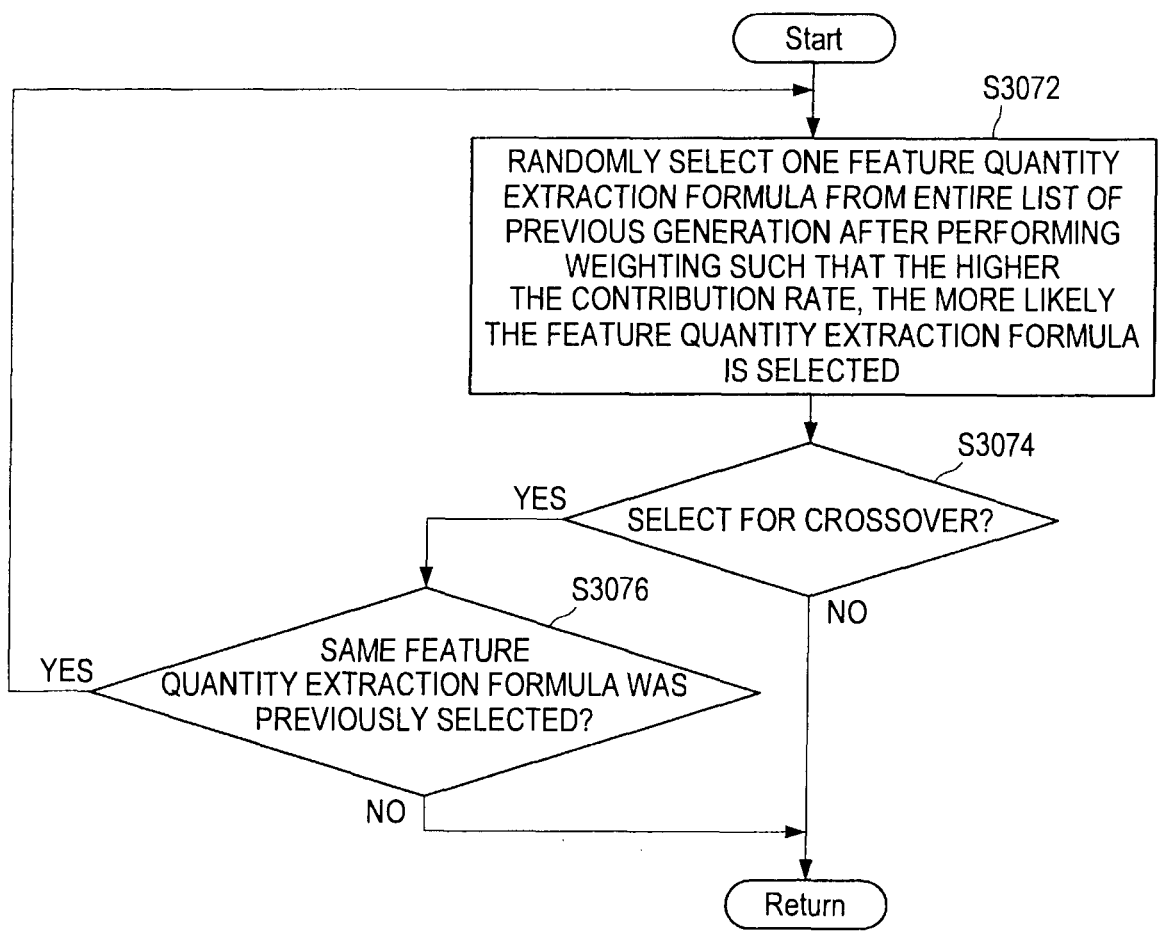
FIG. 16 is an explanatory diagram showing an automatic construction method of the predictor according to the embodiment.

As shown in FIG. 16, the feature quantity extraction formula list creation unit 132 first weights selection probability for each feature quantity extraction formula such that the higher the contribution rate of a feature quantity extraction formula, the higher the probability of the feature quantity extraction formula being selected, and then randomly selects one feature quantity extraction formula from the g-th generation feature quantity extraction formulae (S3072). Then, the feature quantity extraction formula list creation unit 132 decides whether the selected feature quantity extraction formula is one that has already been selected for the crossover process or not (S3074).

In a case the feature quantity extraction formula is one that has already been selected for the crossover process, the feature quantity extraction formula list creation unit 132 proceeds with the process to step S3076. On the other hand, in a case the feature quantity extraction formula has not been already selected for the crossover process, the feature quantity extraction formula list creation unit 132 proceeds with the process to the next processing step (S3056 (in the case of S3054) or S3058 (in the case of S3056)) forming step S3036.

In the case the process proceeded to step S3076, the feature quantity extraction formula list creation unit 132 decides whether the same feature quantity extraction formula has already been selected or not (S3076). In a case the same feature quantity extraction formula has already been selected, the feature quantity extraction formula list creation unit 132 returns the process again to step S3072, and newly selects one feature quantity extraction formula (S3072). On the other hand, in a case the same feature quantity extraction formula has not already been selected, the feature quantity extraction formula list creation unit 132 proceeds with the process to the next processing step (S3056 (in the case of S3054) or S3058 (in the case of S3056)) forming step S3036.

(S3038 (Cf. S3006): Mutation)

Here, the process according to step S3038 (mutation process) mentioned above will be described in greater detail with reference to FIG. 17. Additionally, the mutation process performed here is one of characteristic processes of a genetic algorithm corresponding to the mechanism of, when taking a feature quantity extraction formula as a living body and processing functions as genes, genes of a living body being partially mutated in the evolutionary process and a living body with a new combination of genes being born.

Figure 17:
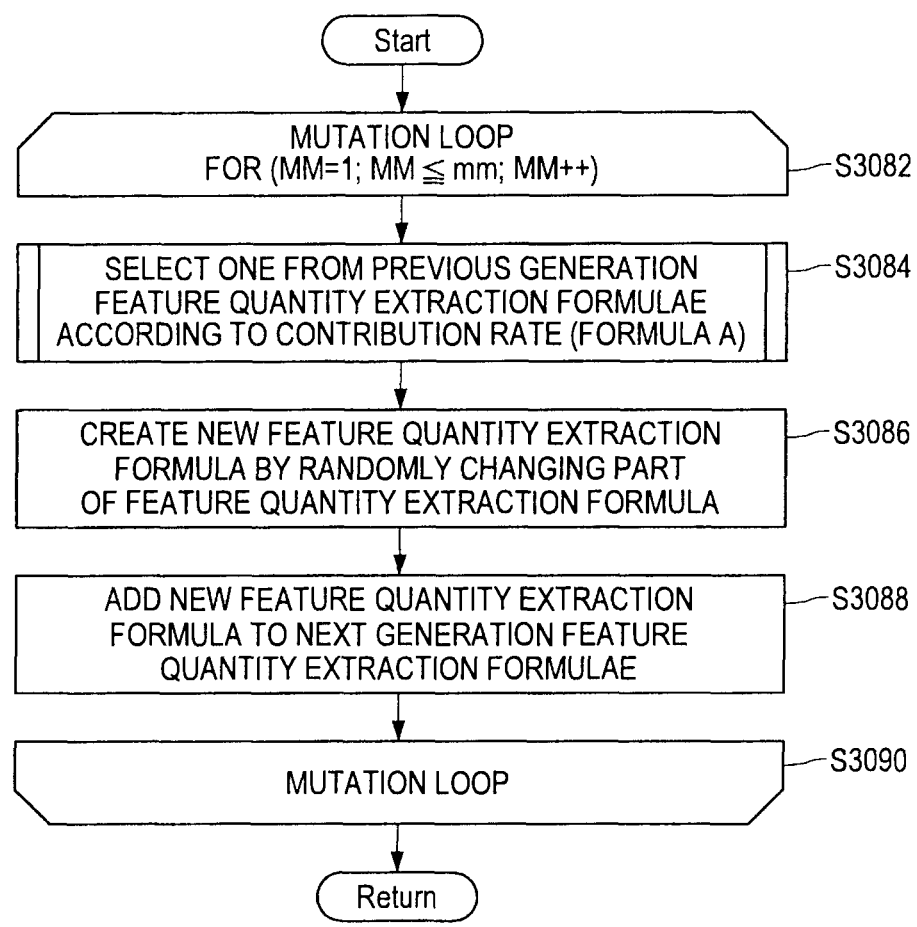
FIG. 17 is an explanatory diagram showing an automatic construction method of the predictor according to the embodiment.

As shown in FIG. 17, the feature quantity extraction formula list creation unit 132 repeatedly performs the processes of steps S3084 to S3088 while incrementing index MM from 1 to mm, and creates mm feature quantity extraction formulae (S3082, S3090). First, the feature quantity extraction formula list creation unit 132 sets index MM to 1 (S3082), and selects one feature quantity extraction formula (formula A) from the g-th generation feature quantity extraction formulae (S3084). At this time, the feature quantity extraction formula list creation unit 132 performs the same process as the process of step S3054 shown in FIG. 16 and selects one feature quantity extraction formula (formula A) based on the contribution rates of the feature quantity extraction formulae.

Next, the feature quantity extraction formula list creation unit 132 changes a part of the processing functions included in the feature quantity extraction formula to randomly selected processing functions, and creates a new feature quantity extraction formula (S3086). Then, the feature quantity extraction formula list creation unit 132 adds the new feature quantity extraction formula created in step S3086 to the feature quantity extraction formula list (S3088). Then, the feature quantity extraction formula list creation unit 132 increments index MM by 1, and performs again the processes of steps S3084 to S3088 (S3090).

Next, the feature quantity extraction formula list creation unit 132 repeatedly performs the processes of steps S3084 to S3088 until index MM reaches mm, and creates mm feature quantity extraction formulae. Then, the feature quantity extraction formula list creation unit 132 proceeds with the process to step S3040.

(S3040 (Cf. S3006): Random Creation)

Here, the process according to step S3040 (random creation process) mentioned above will be described in greater detail with reference to FIG. 18.

Figure 18:
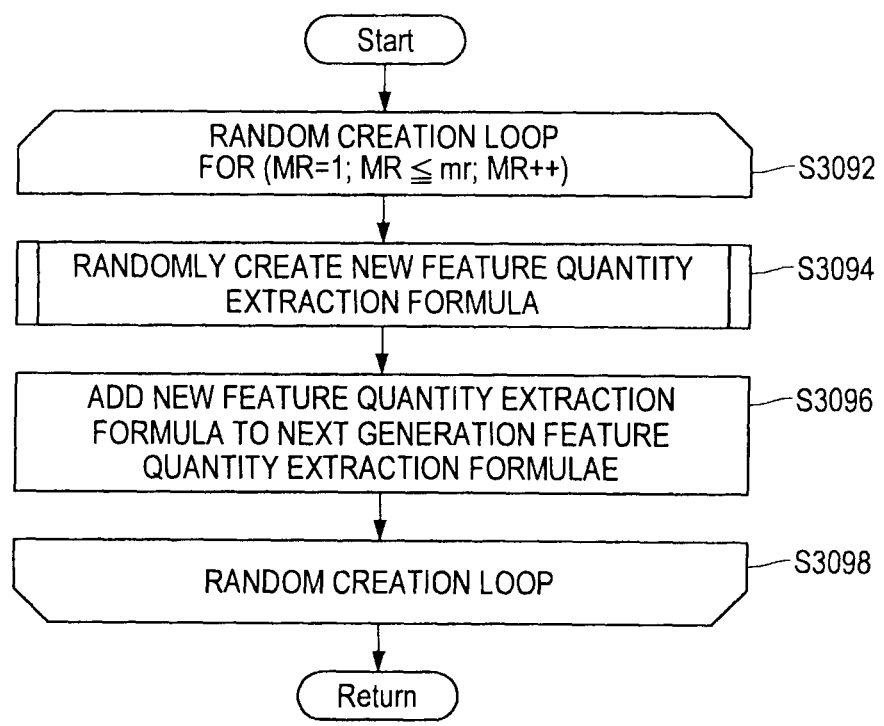
FIG. 18 is an explanatory diagram showing an automatic construction method of the predictor according to the embodiment.

As shown in FIG. 18, the feature quantity extraction formula list creation unit 132 repeatedly performs the processes of steps S3094 to S3096 while incrementing index MR from 1 to mr, and creates mr feature quantity extraction formulae (S3092, S3098). First, the feature quantity extraction formula list creation unit 132 sets index MR to 1 (S3092), and creates a new feature quantity extraction formula by randomly combining the processing functions (S3094).

Next, the feature quantity extraction formula list creation unit 132 adds the new feature quantity extraction formula created in step S3094 to the feature quantity extraction formula list (S3096). Then, the feature quantity extraction formula list creation unit 132 increments index MR by 1, and performs again the processes of steps S3094 and S3096 (S3098). Then, the feature quantity extraction formula list creation unit 132 repeatedly performs the processes of steps S3094 and S3096 until index MR reaches mr, and creates mr feature quantity extraction formulae. Additionally, each feature quantity extraction formula is created such that the output will be a scalar quantity.

When the process of step S3040 is complete, the process of step S3006 is complete. The feature quantity extraction formula list including total m feature quantity extraction formulae created by steps S3034, S3036, S3038 and S3040 is input to the feature quantity calculation unit 134. Then, as shown in FIG. 9, the predictor construction unit 106 proceeds with the process to step S304.

(S304: Calculation of Feature Quantity)

Next, the process of step S304 will be described in greater detail with reference to FIG. 19. The process performed here is mainly performed by the function of the feature quantity calculation unit 134. Additionally, it is assumed that a feature quantity extraction formula list created in step S3004 or S3006 is input to the feature quantity calculation unit 134 from the feature quantity extraction formula list creation unit 132. It is also assumed that this feature quantity extraction formula list includes m feature quantity extraction formulae.

Figure 19:
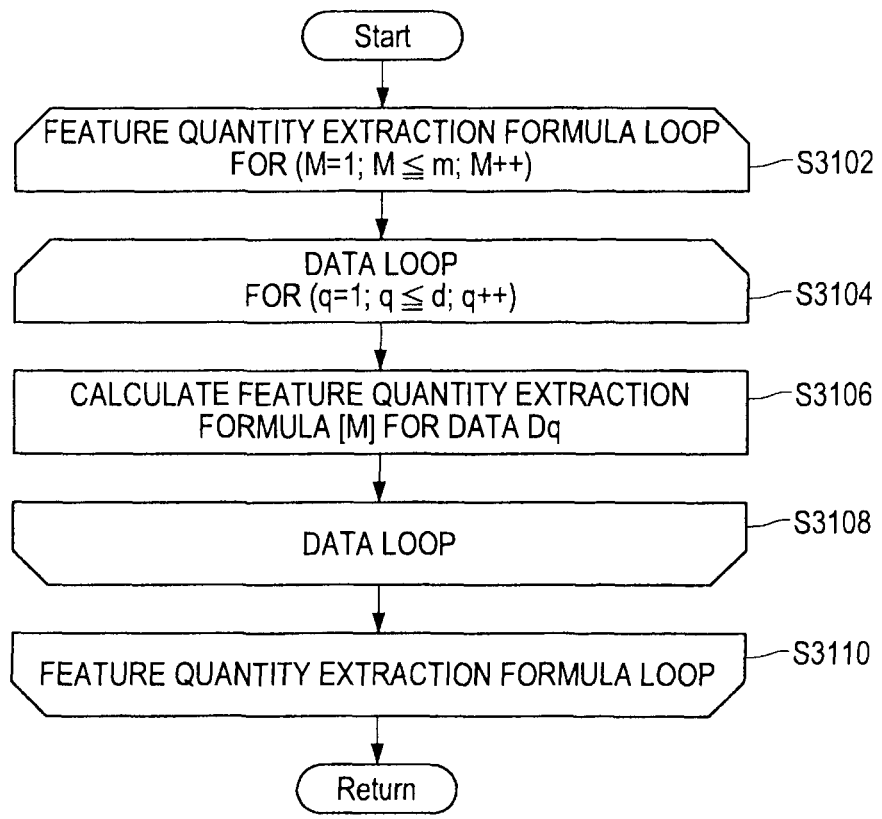
FIG. 19 is an explanatory diagram showing an automatic construction method of the predictor according to the embodiment.

As shown in FIG. 19, the feature quantity calculation unit 134 repeatedly performs the processes of steps S3104 to S3108 while updating index M from 1 to m (S3102, S3110). Also, the feature quantity calculation unit 134 repeatedly performs the process of step S3106 while updating index q from 1 to d (S3104, S3108).

First, the feature quantity calculation unit 134 sets index M to 1 and proceeds with the process to step S3104 (S3102). Next, the feature quantity calculation unit 134 sets index q to 1 and proceeds with the process to step S3106 (S3104).

Next, the feature quantity calculation unit 134 inputs prediction-basis data Dq from time q to q+w−1 to feature quantity extraction formula [M] and calculates a feature quantity (S3106). Here, feature quantity extraction formula [M] means the M-th feature quantity extraction formula among feature quantity extraction formulae included in the feature quantity extraction formula list. Then, the feature quantity calculation unit 134 returns the process to step S3104 (S3108), increments index q by 1 (S3104), and proceeds with the process again to step S3106.

Then, the feature quantity calculation unit 134 repeatedly performs the processes of steps S3104 to S3108 until index q reaches d, and calculates feature quantities [M][q] obtained by inputting pieces of prediction-basis data Dq (q=1, ..., d) to feature quantity extraction formula [M].

Next, the feature quantity calculation unit 134 proceeds with the process to step S3110, and returns the process to step S3102 (S3110). Then, the feature quantity calculation unit 134 increments index M by 1 (S3102), proceeds with the process again to step S3104, and repeatedly performs the processes of steps S3104 to S3108.

The feature quantity calculation unit 134 repeatedly performs the processes of steps S3104 to S3108 until index M reaches m, and calculates feature quantities [M][q] obtained by inputting pieces of prediction-basis data Dq (q=1, ..., d) to feature quantity extraction formulae [M] (M=1, ..., m; q=1, ..., d).

In this manner, in step S304, the feature quantity calculation unit 134 calculates feature quantity [M][q] (M=1, ..., m; q=1, ..., d) by inputting a piece of prediction-basis data Dq (q=1, ..., d) to each feature quantity extraction formula [M] (M=1, ..., m). Furthermore, feature quantity [M][q] calculated by the process of step S304 is input to the machine learning unit 136. Then, as shown in FIG. 9, the predictor construction unit 106 proceeds with the process to step S306.

(S306: Machine Learning)

Next, the process of step S306 will be described in greater detail with reference to FIG. 20. The process performed here is mainly performed by the function of the machine learning unit 136. Additionally, it is assumed that feature quantity [M][q] (M=1, ..., m; q=1, ..., d) is input to the machine learning unit 136 from the feature quantity calculation unit 134. It is also assumed that predicted data Dq (q=1, ..., d) is input to the machine learning unit 136.

Figure 20:
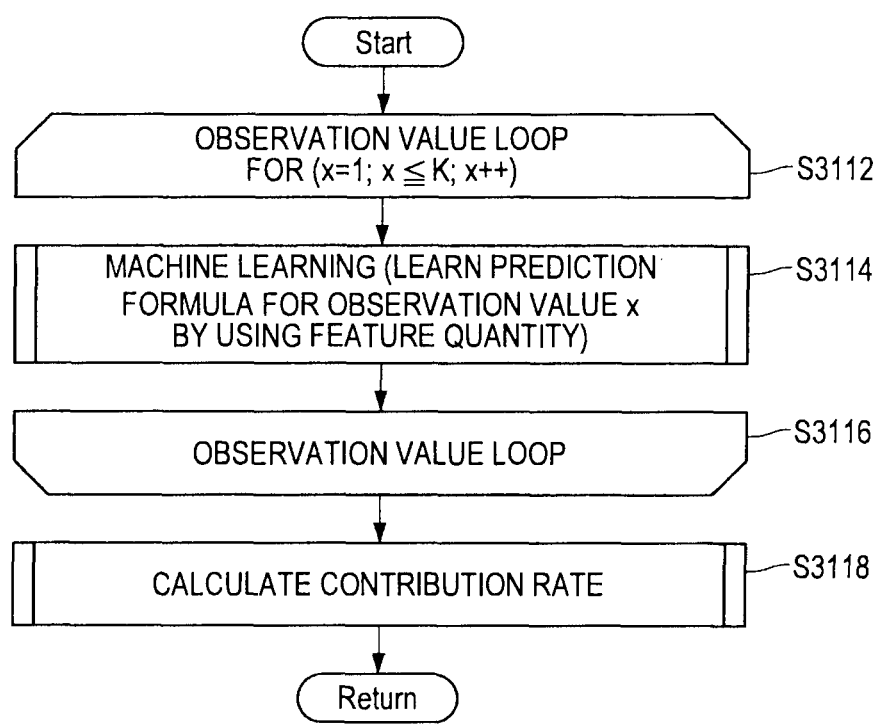
FIG. 20 is an explanatory diagram showing an automatic construction method of the predictor according to the embodiment.

As shown in FIG. 20, the machine learning unit 136 repeatedly performs the process of step S3114 while incrementing index x from 1 to K (S3112, S3116). First, the machine learning unit 136 sets index x to 1 (S3112), and proceeds with the process to step S3114. Next, the machine learning unit 136 performs machine learning by using feature quantity [M][q] and predicted data Dq corresponding to observation value x, and calculates a prediction formula for observation value x (S3114). In a case of creating a prediction formula by linearly combining a plurality of feature quantity extraction formulae, each combination coefficient is calculated in step S3114.

Next, the machine learning unit 136 returns the process to step S3112 (S3116), increments index x by 1 (S3112), and performs the process of step S3114. Furthermore, the machine learning unit 136 repeatedly performs the process of step S3114 until index x reaches K, and creates a prediction formula for each of observation values 1 to K.

Next, the machine learning unit 136 calculates a contribution rate of each feature quantity extraction formula to the prediction formula constructed in steps S3112 to S3116 (S3118). At this time, the machine learning unit 136 calculates, based on a combination coefficient of each feature quantity extraction formula included in the prediction formula, the contribution rate of each feature quantity extraction formula to the prediction formula. Then, as shown in FIG. 9, the predictor construction unit 106 proceeds with the process to step S308.

(S3114 (Cf. S306): Creation of Predictor by Machine Learning)

Here, the process according to step S3114 mentioned above will be described in greater detail with reference to FIG. 21.

Figure 21:
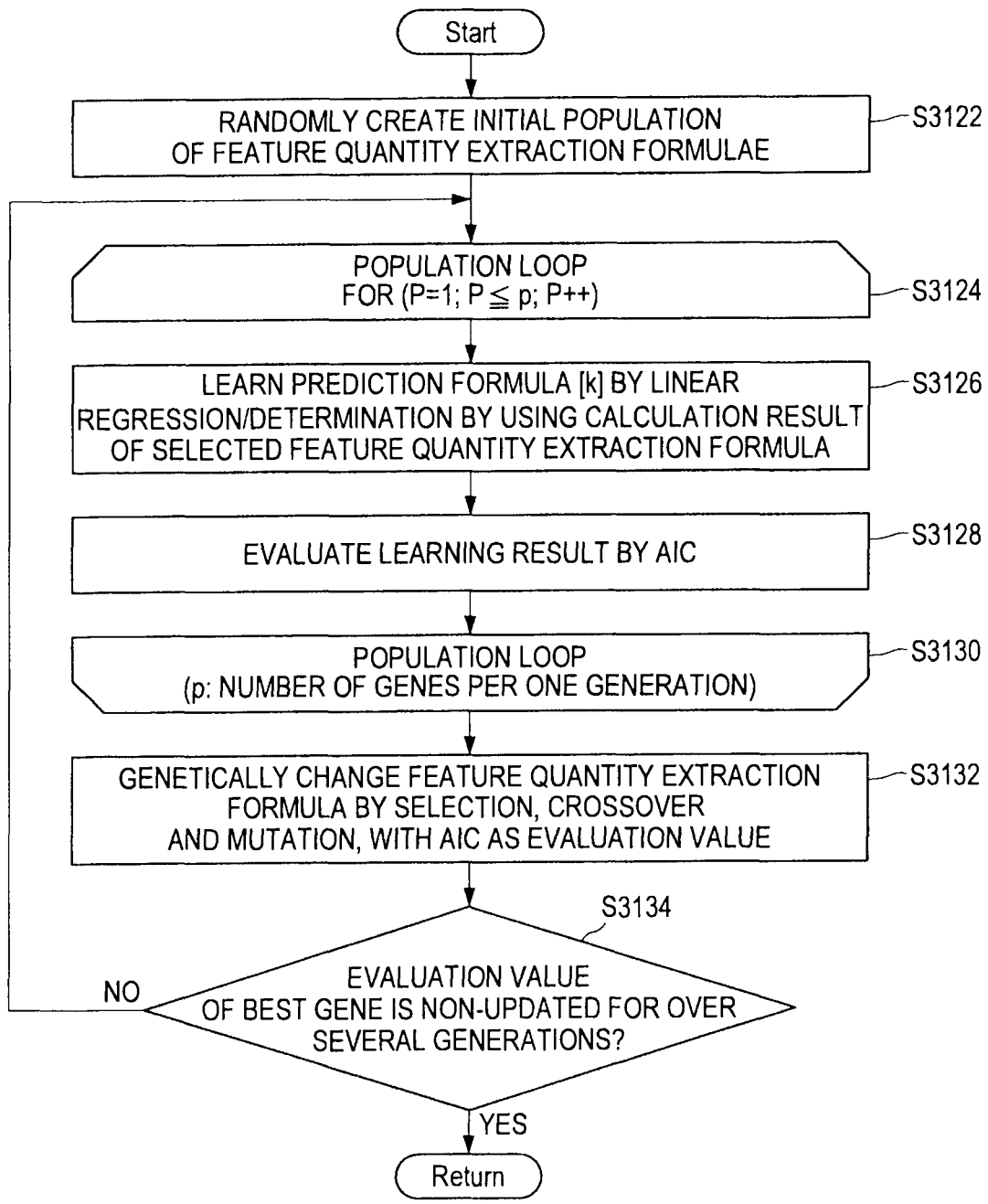
FIG. 21 is an explanatory diagram showing an automatic construction method of the predictor according to the embodiment.

As shown in FIG. 21, the machine learning unit 136 randomly selects, from a feature quantity extraction formula list, feature quantity extraction formulae to be used for creation of a prediction formula, and creates an initial population (first generation genes) (S3122). Here, the number of feature quantity extraction formulae forming the initial population is assumed to be set to p in advance. Then, the machine learning unit 136 repeatedly performs the processes of steps S3126 and S3128 while updating index P from 1 to p (S3124, S3130).

First, the machine learning unit 136 sets index P to 1, and proceeds with the process to step S3126 (S3124). Then, the machine learning unit 136 creates a prediction formula for each of observation values 1 to K by performing linear regression and determination based on a feature quantity calculated by the feature quantity calculation unit 134 for a feature quantity extraction formula included in the initial population and prediction-basis data (S3126). Next, the machine learning unit 136 evaluates the prediction formulae created in step S3126 by using AIC (S3128).

Next, the machine learning unit 136 returns the process to step S3124 (S3130), increments index P by 1 and proceeds with the process to step S3126 (S3124). Then, the machine learning unit 136 performs again the processes of steps S3126 and S3128. Then, the machine learning unit 136 repeats the processes of steps S3126 and S3128 until index P reaches p, and proceeds with the process to step S3132.

When the process proceeds to step S3132, the machine learning unit 136 uses AIC as an evaluation value, and changes a combination of feature quantity extraction formulae used for creation of a prediction formula by selection, crossover and mutation (S3132). That is, in step S3132, the machine learning unit 136 creates second generation genes from the first generation genes.

Next, the machine learning unit 136 decides whether the evaluation value of the best gene is not updated for over a predetermined number of generations (S3134). In a case it is not a state where the evaluation value of the best gene is not updated for over a predetermined number of generations, the machine learning unit 136 returns the process to step S3124, and performs again the processes of steps S3124 to S3134.

On the other hand, as shown in FIG. 20, in the case the evaluation value of the best gene is not updated for over a predetermined number of generations, the machine learning unit 136 proceeds with the process to step S3116. Furthermore, when the repeating process of steps S3112 to S3116 is complete, the machine learning unit 136 proceeds with the process to step S3118.

(S3118 (Cf. S306): Calculation of Contribution Rate)

Here, the process according to step S3118 mentioned above will be described in greater detail with reference to FIG. 22.

Figure 22:
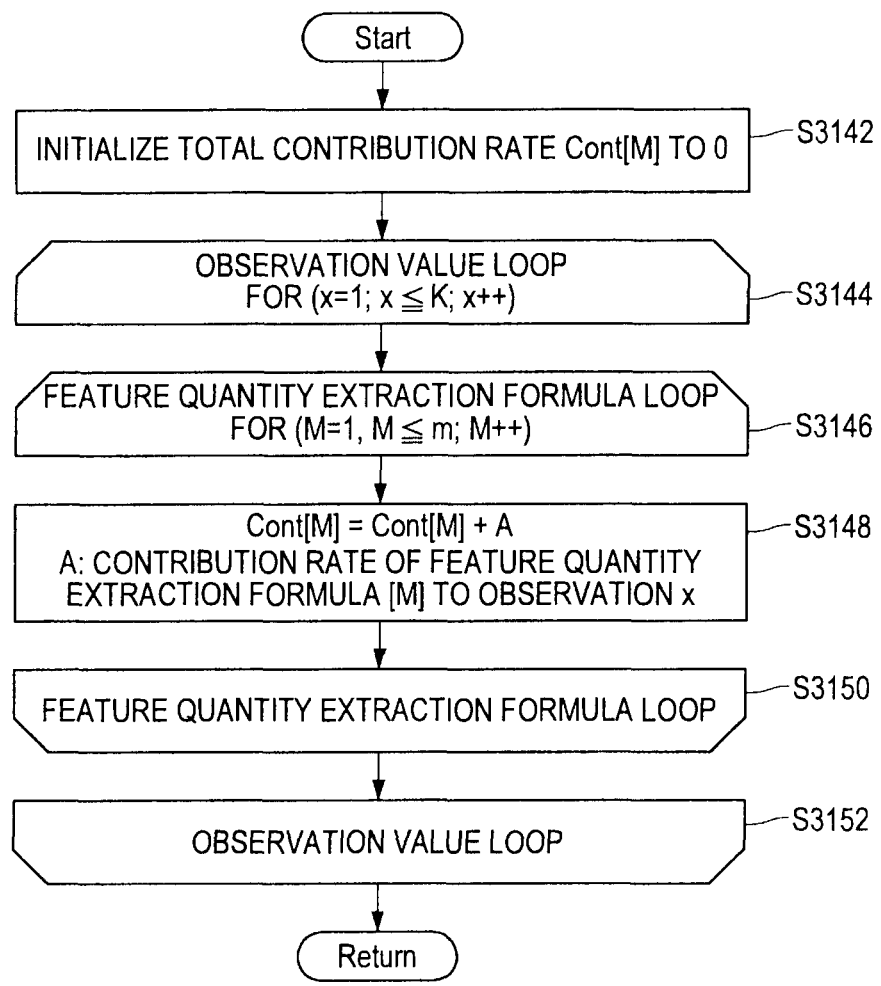
FIG. 22 is an explanatory diagram showing an automatic construction method of the predictor according to the embodiment.

As shown in FIG. 22, the machine learning unit 136 initializes total contribution rate Cont[M] to 0 (S3142). Next, the machine learning unit 136 repeatedly performs the processes of steps S3146 to S3150 while updating index x from 1 to K (S3144, S3152). Also, in the case the process proceeded to step S3146, the machine learning unit 136 repeatedly performs the process of step S3148 while updating index M from 1 to m (S3146, S3150).

In step S3148, the machine learning unit 136 first calculates, with regard to observation value x, a contribution rate of feature quantity extraction formula [M] to a prediction formula. This contribution rate is calculated based on a combination coefficient of feature quantity extraction formula [M] calculated for each observation value at the time of creating a prediction formula. For example, the contribution rate is a value that includes a square of the combination coefficient. Additionally, the contribution rate of a feature quantity extraction formula not included in the prediction formula is 0. Next, the machine learning unit 136 calculates total contribution rate Cont[M]=Cont[M]+contribution rate of feature quantity extraction formula [M] to observation value x (S3148).

By repeating the processes of steps S3144 to S3152 and repeating the processes of steps S3146 to S3150, the total contribution rate Cont[M] of each feature quantity extraction formula to the observation values 1 to K will be calculated for all the feature quantity extraction formulae included in the feature quantity extraction formula list. The total contribution rate Cont[M] of each feature quantity extraction formula calculated in step S3118 will be used as an evaluation value for the prediction formula. When the process of step S3118 is complete, the machine learning unit 136 ends the process of step S306.

Heretofore, the flow of automatic construction processing of a predictor has been described.

(1-3-4: Prediction of Observation Value by Predictor)

Figure 23:
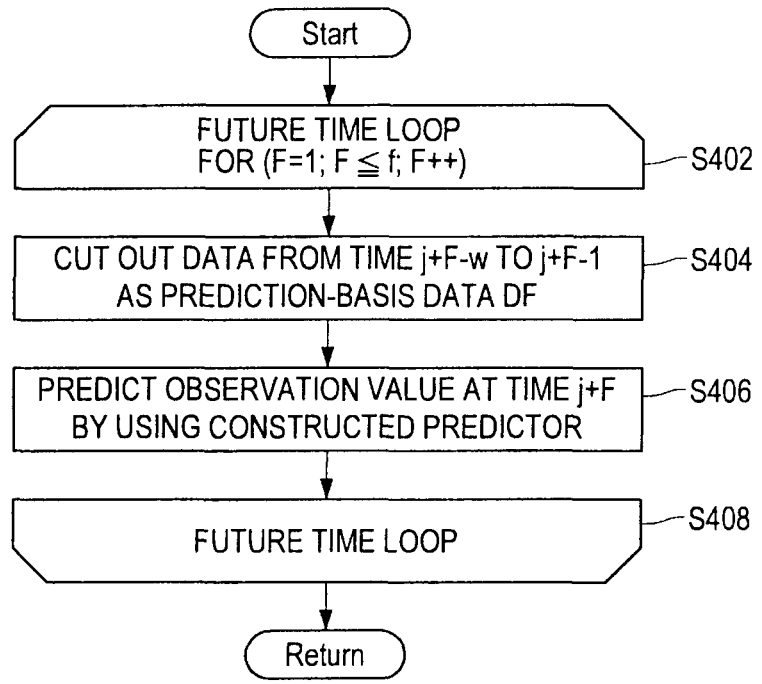
FIG. 23 is an explanatory diagram showing a prediction method of an observation value using the predictor according to the embodiment.

Next, a flow of prediction processing of an observation value by a predictor corresponding to Step 4 in FIG. 7 will be described with reference to FIG. 23. FIG. 23 is an explanatory diagram showing a flow of prediction processing of an observation value by a predictor corresponding to Step 4 in FIG. 7. Additionally, the process described here is performed by the prediction unit 108. Also, it is assumed that the prediction unit 108 has a predictor input thereto from the predictor construction unit 106.

As shown in FIG. 23, the prediction unit 108 repeatedly performs the processes of steps S404 and S406 while updating index F from 1 to f (S402, S408). In step S404, the prediction unit 108 cuts out prediction values from time j+F−w to j+F−1 as prediction-basis data DF (S404). Next, the prediction unit 108 inputs prediction-basis data DF to a predictor and calculates a prediction value (predicted data DF) which may be observed at time j+F (S406). Then, by repeatedly performing the processes of steps S404 and S406 while updating index F, prediction values from time j to j+f are calculated, as shown in FIG. 6.

Heretofore, a flow of the prediction processing of the observation value by the predictor has been described.

As described above, when adopting the technology according to the present embodiment, a predictor that predicts a future observation value from a past observation value by machine learning based on a genetic algorithm can be automatically constructed with high accuracy. Furthermore, a future observation value can be predicted by repeatedly using this predictor. Then, a user does not have to cut out, from an observation value, appropriate data used for prediction, process the data or construct a prediction model.

1-4: Experiment 1

Application to Simple Pendulum

Here, a result of an experiment (hereinafter, experiment 1) of applying the prediction algorithm according to the present embodiment to a concrete example (motion prediction of a simple pendulum driven by torque) will be shown in FIGS. 24 and 25.

Figure 24:
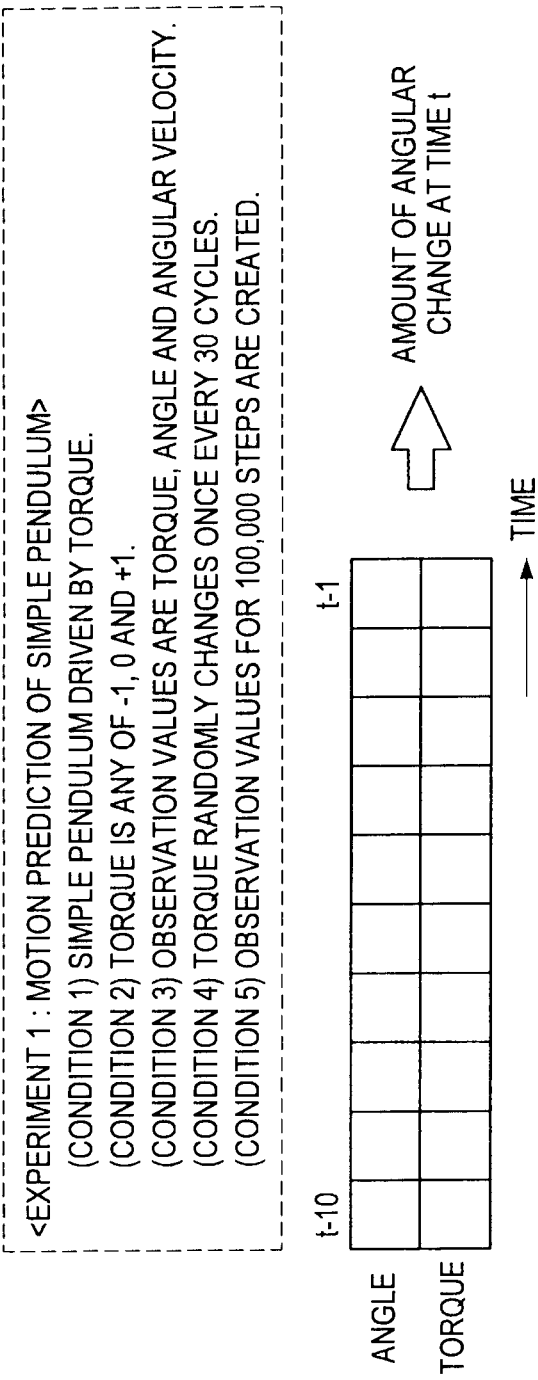
FIG. 24 is an explanatory diagram showing a concrete application method for a case of applying the prediction method of an observation value to motion prediction of a simple pendulum.

As shown in FIG. 24, conditions of experiment 1 are as follows.

(Condition 1) Motion prediction of a two-dimensional simple pendulum driven by torque is performed.

(Condition 2) Torque is any of −1, 0 and +1.

(Condition 3) Observation values are torque, angle and angular velocity.

(Only Torque and Angle are Used for Learning.)

(Condition 4) Torque randomly changes once every 30 cycles.

(Condition 5) Observation values for 100,000 steps are used for learning.

(Time width of prediction-basis data is 10 steps.)

Figure 25:
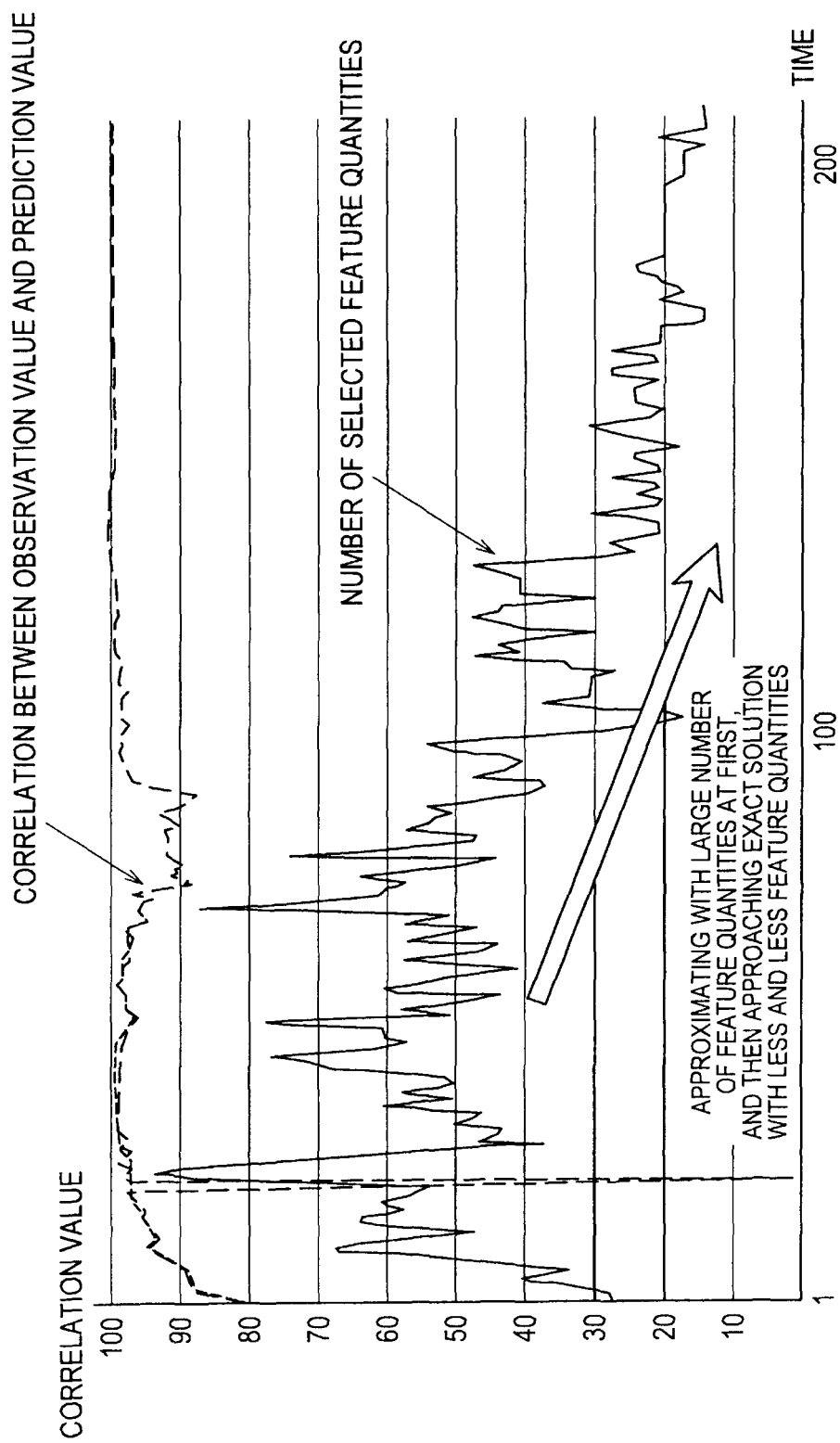
FIG. 25 is an explanatory diagram showing a result obtained in a case the prediction method of an observation value is applied to the motion prediction of a simple pendulum according to the embodiment.

An experiment result is shown in FIG. 25. FIG. 25 shows a result of comparison between motion (observation value) of a simple pendulum actually moving by using an algorithm for the two-dimensional simple pendulum driven by torque mentioned above and motion (prediction value) of a simple pendulum predicted by using a predictor. To quantitatively compare the both, a correlation value between the observation value and the prediction value is shown in FIG. 25. As shown in FIG. 25, the correlation value approximates to 1 with time, and becomes approximately 1 after the elapse of a certain time. That is, it can be seen that the motion of the simple pendulum is predicted with sufficiently high accuracy.

Furthermore, the number of feature quantities used for construction of the predictor is also shown in FIG. 25. Referring to the change in the number of feature quantities, it can be seen that the number of feature quantities gradually decreases with the passing of time. That is, it can be seen that, immediately after starting the prediction process, a change in the observation value is predicted with a large number of feature quantities, but as learning progresses, it becomes possible to predict the change in the observation value with less and less feature quantities.

1-5: Experiment 2

Application to Two-Dimensional Cellular Automaton

Next, a result of an experiment (hereinafter, experiment 2) of applying the prediction algorithm according to the present embodiment to another concrete example (two-dimensional cellular automaton) will be shown in FIGS. 26 and 27.

Figure 26:
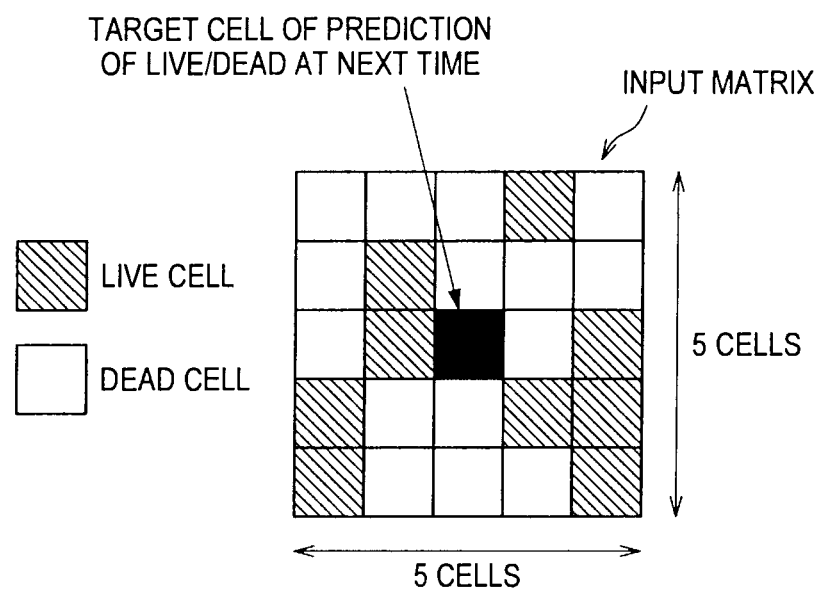
FIG. 26 is an explanatory diagram showing a concrete application method for a case of applying the prediction method of an observation value to a pattern change prediction of a two-dimensional cellular automaton.

As shown in FIG. 26, conditions of experiment 2 are as follows.

(Condition 1) A live cell with two or three live cells within neighbouring 3×3 area lives.

(Condition 2) A dead cell with three live cells within neighbouring 3×3 area becomes alive.

A pattern of live cells (hereinafter, cell pattern) for 10 steps changing within 32×24 cells is used for learning. However, not all the 32×24 cells are learned, and as shown in FIG. 26, 5×5 cells (input matrix) are made the target of input and live/dead of a centre cell is made the target of prediction. A predictor that predicts live/dead of the centre cell at a next time is automatically constructed, and prediction processing of the cell pattern is performed by using the predictor.

Figure 27:
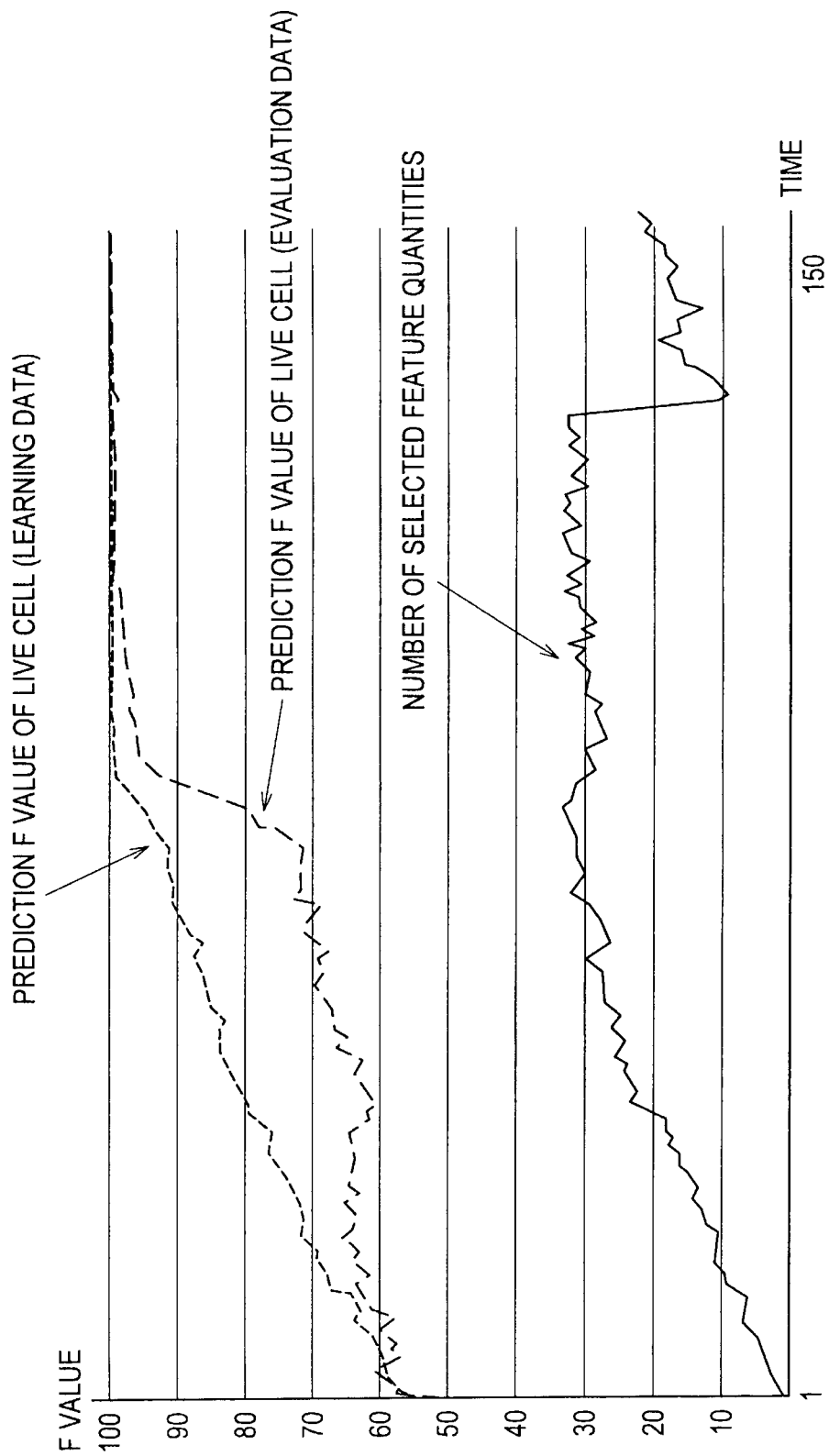
FIG. 27 is an explanatory diagram showing a result obtained in a case the prediction method of an observation value is applied to the pattern change prediction of a two-dimensional cellular automaton.

An experiment result is shown in FIG. 27. FIG. 27 shows a result of comparison between a cell pattern (observation value) actually changing by using an algorithm for the two-dimensional cellular automaton mentioned above and a cell pattern (prediction value) predicted by using the predictor. To quantitatively compare the both, a prediction F value of a live cell is shown in FIG. 27. As shown in FIG. 27, the F value approximates to 1 with time, and becomes approximately 1 after the elapse of a certain time. That is, it can be seen that a change in the cell pattern is predicted with sufficiently high accuracy.

Furthermore, the number of feature quantities used for construction of the predictor is also shown in FIG. 27. Referring to the change in the number of feature quantities, it can be seen that the number of feature quantities decreases at a time point a certain amount of time has elapsed. That is, it can be seen that, immediately after starting the prediction process, the observation value is predicted with a large number of feature quantities, but as learning progresses, it becomes possible to predict the observation value with less and less feature quantities.

1-6: Experiment 3

Application to Flock-of-Bird Algorithm

Next, a result of an experiment (hereinafter, experiment 3) of applying the prediction algorithm according to the present embodiment to another concrete example (flock-of-bird algorithm Boids=Bird-oid) will be shown in FIGS. 28 and 29.

Figure 28:
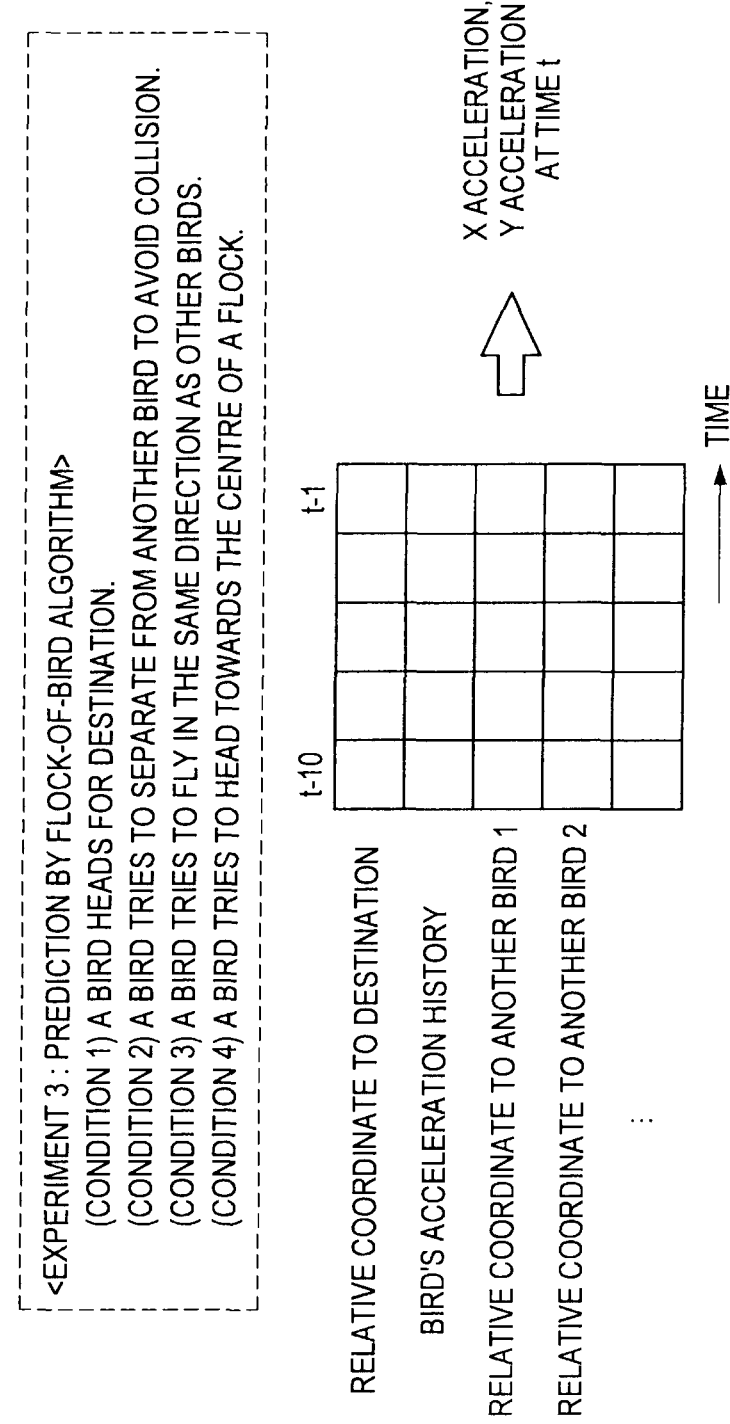
FIG. 28 is an explanatory diagram showing a concrete application method for a case of applying the prediction method of an observation value to motion prediction of a bird based on a flock-of-bird algorithm.

As shown in FIG. 28, conditions of experiment 3 are as follows.

(Condition 1) A bird heads for a destination.

(Condition 2) A bird tries to separate from another bird to avoid collision.

(Condition 3) A bird tries to fly in the same direction as other birds.

(Condition 4) A bird tries to head towards the centre of a flock.

Furthermore, a relative coordinate with a destination a bird is heading for as a reference, the bird's acceleration history, and a relative coordinate to each of the other birds are used for learning. Furthermore, the location of the destination is randomly changed. Furthermore, the number of birds is set to 20, and the number of learning steps is set to 1000.

Figure 29:
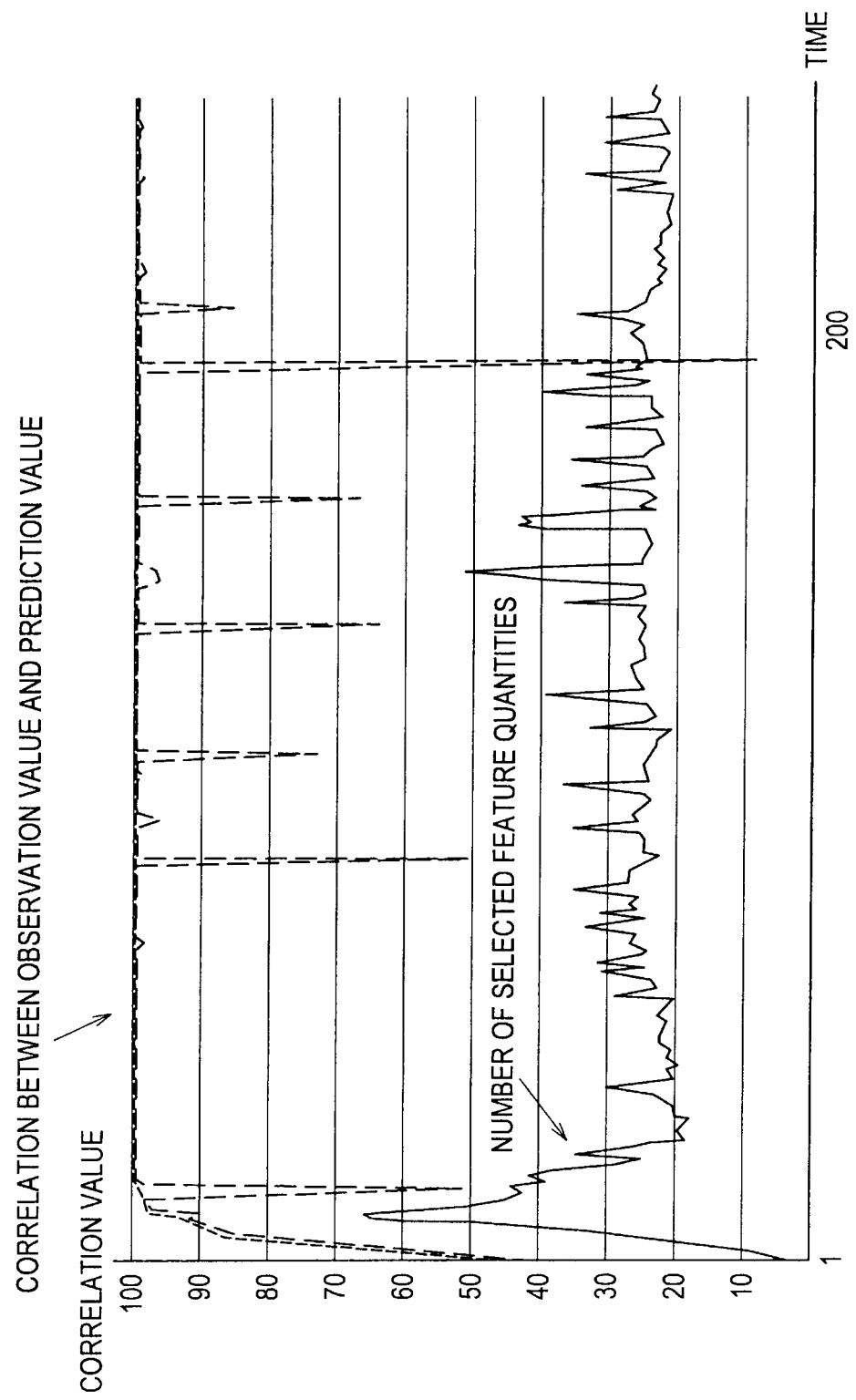
FIG. 29 is an explanatory diagram showing a result obtained in a case the prediction method of an observation value is applied to the motion prediction of a bird based on the flock-of-bird algorithm.

An experiment result is shown in FIG. 29. FIG. 29 shows a result of comparison between a pattern of a bird flock (observation value) actually changing by using the flock-of-bird algorithm mentioned above and a pattern of a bird flock (prediction value) predicted by using a predictor. To quantitatively compare the both, a correlation value between the observation value and the prediction value is shown in FIG. 29. As shown in FIG. 29, the correlation value approximates to 1 with time, and, although it momentarily drops from time to time, it becomes approximately 1 after the elapse of a certain time. That is, it can be seen that a change in the pattern of a bird flock is predicted with sufficiently high accuracy.

Furthermore, the number of feature quantities used for construction of the predictor is also shown in FIG. 29. Referring to the change in the number of feature quantities, it can be seen that the number of feature quantities is reduced to a certain degree after the elapse of a certain time. That is, it can be seen that, immediately after starting the prediction process, the observation value is predicted with a large number of feature quantities, but as learning progresses, it becomes possible to predict the observation value with comparatively small number of feature quantities.

Heretofore, the automatic construction method of a predictor and the prediction method according to the present embodiment, and results of experiments using these methods have been described. The automatic construction method of a predictor described above can be used as algorithm creation means that realizes a realistic background image (motion of a bird, movement of trees or cloud, movement of other mobile bodies) of computer graphics. As has been described, the automatic construction algorithm of a predictor according to the present embodiment can automatically construct an appropriate predictor when observation values as data for learning are simply input thereto. Accordingly, the trouble of creating an algorithm for creating the background image can be saved. Furthermore, the operation itself of the predictor is realized with a small processing load, and thus, can be sufficiently performed by a small game machine or a small video device. As described, the technology according to the present embodiment is an extremely advantageous technology also from the standpoint of utility.

6: Hardware Configuration

Here, an example of a hardware configuration of the information processing apparatus 100 described above will be described. The function of each structural element of the information processing apparatus 100 described above can be realized by using the hardware configuration of an information processing apparatus shown in FIG. 30, for example. That is, the function of each of the structural elements is realized by controlling the hardware shown in FIG. 30 by using a computer program.

Figure 30:
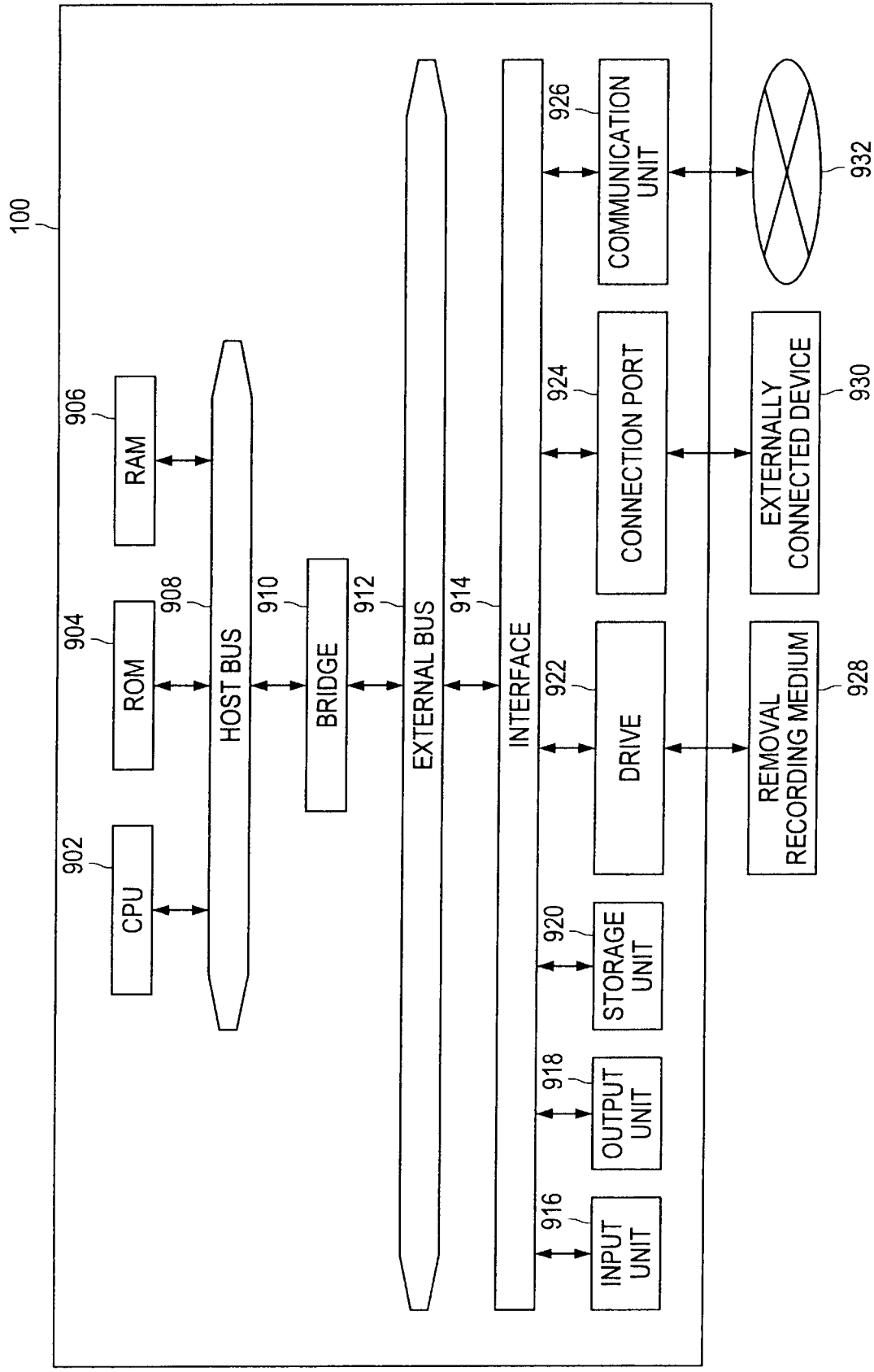
FIG. 30 is an explanatory diagram showing an example of a hardware configuration capable of realizing a function of the information processing apparatus of the embodiment.

As shown in FIG. 30, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device for connecting to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

3: Summary

Lastly, technical contents according to the embodiment of the present invention will be briefly described. The technical contents stated here can be applied to various information processing apparatuses, such as a personal computer, a game machine, and the like.

The functional configuration of the information processing apparatus described above can be expressed as follows. The information processing apparatus includes a predictor construction unit that creates, by machine learning based on a genetic algorithm and by combining processing functions prepared in advance, a plurality of feature quantity extraction formulae for extracting, from an observation value observed before a predetermined time, feature quantities of the observation value, and creates a prediction formula for predicting an observation value at the predetermined time based on the feature quantities calculated by the plurality of feature quantity extraction formulae, and a prediction unit that predicts an observation value at a time t from an observation value observed before the time t, by using the prediction formula created by the predictor construction unit.

According to this configuration, an observation value can be directly used as data for learning, and thus, the trouble of cutting out appropriate data for learning from the observation value or processing the observation value into an appropriate data format can be saved. Also, a prediction formula is automatically created without working out a prediction model, thereby making analysis or modeling of a phenomenon serving as a base of the observation value unnecessary. Furthermore, since a genetic algorithm is used, a prediction formula capable of predicting the observation value with high accuracy is created.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-277084 filed in the Japan Patent Office on Dec. 4, 2009, the entire content of which is hereby incorporated by reference.

What is claimed is:

1. An information processing apparatus comprising:
a physical processor;
a predictor construction unit, performed by the processor, that
creates, by machine learning based on a genetic algorithm and by combining processing functions prepared in advance, a plurality of feature quantity extraction formulae for extracting, from an observation value observed before a predetermined time, feature quantities of the observation value,
creates a prediction formula for predicting an observation value at the predetermined time by linearly combining at least two of the plurality of feature quantity extraction formulae, a combination coefficient being assigned to each feature quantity extraction formula of the prediction formula,
calculates a contribution rate of each feature quantity extraction formula of the prediction formula to the prediction formula based on the combination coefficient,
calculates a total contribution rate to the prediction formula, and
decides whether the total contribution rate satisfies a predetermined terminating condition to determine whether to use the prediction formula for predicting the observation value at the predetermined time; and
a prediction unit, performed by the processor, that predicts an observation value at a time t from an observation value observed before the time t, by using the prediction formula created by the predictor construction unit.

2. The information processing apparatus according to claim 1, wherein, after predicting the observation value at the time t from the observation value observed before the time t, the prediction unit predicts, from the observation value at the time t that has been predicted and the observation value observed before the time t, an observation value to be observed at a time t' subsequent to the time t, by using the plurality of feature quantity extraction formulae and the prediction formula created by the predictor construction unit.

3. The information processing apparatus according to claim 1, wherein the combination coefficient is calculated from a feature quantity group corresponding to the observation value.

4. The information processing apparatus according to claim 2, further comprising:
a prediction data creation unit, performed by the processor, that
prepares an initial value, at a time t0, of an observation value relating to motion of an object,
performs, taking the initial value as a first input, prediction processing of the observation value by the prediction unit successively for times tj (j=1, . . . , N) following the time t0, and
creates prediction data for the observation value at the times t1 to tN; and
a motion simulator, performed by the processor, that simulates the motion of a physical substance by using the prediction data created by the prediction data creation unit.

5. The information processing apparatus according to claim 2, wherein, in a case a new observation value is observed after creating the plurality of feature quantity extraction formulae and the prediction formula, the predictor construction unit re-creates, based on the plurality of feature quantity extraction formulae and the prediction formula that have been already created and from the newly observed observation value, the plurality of feature quantity extraction formulae and the prediction formula.

6. An observation value prediction method comprising the steps of:
- creating, by machine learning based on a genetic algorithm and by combining processing functions prepared in advance, a plurality of feature quantity extraction formulae for extracting, from an observation value observed before a predetermined time, feature quantities of the observation value;
- creating a prediction formula for predicting an observation value at the predetermined time by linearly combining at least two of the plurality of feature quantity extraction formulae, a combination coefficient being assigned to each feature quantity extraction formula of the prediction formula;
- calculating a contribution rate of each feature quantity extraction formula of the prediction formula to the prediction formula based on the combination coefficient;
- calculating a total contribution rate to the prediction formula;
- deciding whether the total contribution rate satisfies a predetermined terminating condition to determine whether to use the prediction formula for predicting the observation value at the predetermined time; and
- predicting an observation value at a time t from an observation value observed before the time t, by using the prediction formula created in the step of creating.

7. A non-transitory computer-readable medium storing a program for causing a computer to realize:
- a predictor construction function of
  - creating, by machine learning based on a genetic algorithm and by combining processing functions prepared in advance, a plurality of feature quantity extraction formulae for extracting, from an observation value observed before a predetermined time, feature quantities of the observation value,
  - creating a prediction formula for predicting an observation value at the predetermined time by linearly combining at least two of the plurality of feature quantity extraction formulae, a combination coefficient being assigned to each feature quantity extraction formula of the prediction formula;
  - calculating a contribution rate of each feature quantity extraction formula of the prediction formula to the prediction formula based on the combination coefficient,
  - calculating a total contribution rate to the prediction formula, and
  - deciding whether the total contribution rate satisfies a predetermined terminating condition to determine whether to use the prediction formula for predicting the observation value at the predetermined time; and
- a prediction function of predicting an observation value at a time t from an observation value observed before the time t, by using the prediction formula created by the predictor construction function.

* * * * *